United States Patent [19]

Harms et al.

[11] 4,242,259
[45] Dec. 30, 1980

[54] ANTHRAQUINONE-AZO REACTIVE DYESTUFFS

[75] Inventors: Wolfgang Harms, Leverkusen; Klaus von Oertzen, Cologne; Klaus Wunderlich, Leverkusen, all of Fed. Rep. of Germany

[73] Assignee: Bayer Aktiengesellschaft, Leverkusen, Fed. Rep. of Germany

[21] Appl. No.: 22,294

[22] Filed: Mar. 20, 1979

[30] Foreign Application Priority Data

Mar. 22, 1978 [DE] Fed. Rep. of Germany ....... 2812634

[51] Int. Cl.³ ............................................. C09B 29/22
[52] U.S. Cl. ................................................... 260/153
[58] Field of Search ........................................ 260/153

[56] References Cited

U.S. PATENT DOCUMENTS

| | | | |
|---|---|---|---|
| 2,167,804 | 8/1939 | Gubler et al. | 260/153 |
| 2,391,164 | 12/1945 | Kaiser | 260/153 |
| 2,853,482 | 9/1958 | Guhst | 260/153 |
| 2,938,024 | 5/1960 | Brassel et al. | 260/153 |

*Primary Examiner*—Winston A. Douglas
*Assistant Examiner*—Raymond K. Covington
*Attorney, Agent, or Firm*—Sprung, Felfe, Horn, Lynch & Kramer

[57] ABSTRACT

Dyestuffs of the formula

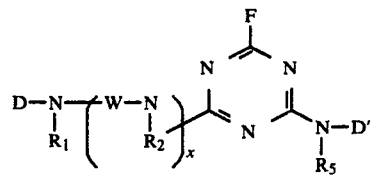

wherein D, W, $R_1$, $R_2$, $R_3$, x and D' have the meaning indicated in the description, and their use for dyeing and printing textile materials containing hydroxyl groups and textile materials containing nitrogen, in particular textile materials of natural and regenerated cellulose, and also of wool, silk, and synthetic polyamide and polyurethane fibres. The resulting dyeings are distinguished by good fastness properties.

7 Claims, No Drawings

ANTHRAQUINONE-AZO REACTIVE DYESTUFFS

The present invention relates to dyestuffs of the formula $$\text{D-N} \underset{R_1}{\overset{}{\vphantom{|}}} \!\!\left(\!\text{W}\!-\!\underset{R_2}{\overset{}{\text{N}}}\!\right)_{\!x}\!\!\begin{array}{c} \diagdown \\ \diagup \end{array}\!\!\begin{array}{c} \text{N} \\ \text{N} \end{array}\!\!\!\diagdown\!\!\begin{array}{c} \text{N—D}' \\ \text{R}_3 \end{array} \quad \text{(I)}$$

(with F)

wherein
D = optionally substituted anthraquinonyl;
W = a bridge member;
$R_1$–$R_3$ = H or optionally substituted $C_1$–$C_4$-alkyl;
x = 0 or 1; and
D' = the radical or an azo dyestuff.

Preferred dyestuffs (I) are those with groups which confer water-solubility, in particular sulpho groups, the dyestuffs preferably containing 1–6 sulpho groups, and D and D' preferably containing sulpho groups.

Preferred substituents of D are sulpho, amino, alkylamino, arylamino and hydroxyl.

Examples which may be mentioned of suitable bridge members W are: -arylene-, -alkylene-, -cycloalkylene-, -aralkylene-, -CO-arylene-, -SO$_2$-arylene-, -SO$_2$-alkylene- and -CO-alkylene-, it being possible for the radicals mentioned to be further substituted.

Particularly suitable radicals $R_1$–$R_3$ are, in addition to hydrogen, methyl, ethyl, hydroxyethyl, carboxyethyl, sulphoethyl and sulphatoethyl.

The preferred radical $R_1$–$R_3$ is hydrogen.

Preferred anthraquinone radicals are those of the formula I in which $$D = \quad \text{(II)}$$

(anthraquinone with $R_4$, $(SO_3H)_r$, $(R_3)_m$)

wherein
$R_4$ = optionally substituted amino;
$R_5$ = a substituent;
m = 0, 1 or 2; and
r = 0 or 1;
and in particular those in which $$D = \quad \text{(III)}$$

(anthraquinone with NH—$R'_4$, $(SO_3H)_r$, $(R'_5)_m$)

wherein
$R'_4$ = H or $C_1$–$C_4$-alkyl, in particular branched $C_3$–$C_4$-alkyl;
$R'_5$ = halogen, in particular Cl or Br; or OH, sulpho, $C_1$–$C_4$-alkoxy or acylamino;
m = 0, 1 or 2; and
r = 0 or 1, preferably 0, if $R'_4 = C_1$–$C_4$-alkyl.

Preferred radicals $$-\text{N}\underset{R_1}{\overset{}{\vphantom{|}}}\!\!\left(\!\text{W}\!-\!\underset{R_2}{\overset{}{\text{N}}}\!\right)_{\!x}\!\! \quad \text{(IV)}$$

are the following:

$$\text{—NH}\!-\!\!\!\begin{array}{c}\text{(Q)}_p \\ \text{(SO}_3\text{H)}_n \end{array}\!\!\!\text{(CH}_2)_q\!-\!\underset{R_2}{\overset{}{\text{N}}}\!- \quad \text{(IV a)}$$

in which
Q = $C_1$–$C_4$-alkyl, $C_1$–$C_4$-alkoxy, carboxyl or halogen, in particular Cl and Br;
p = 0, 1, 2 or 3;
q = 0, 1 or 2; and
n = 0, 1 or 2, and $$\text{—NH}\!-\!\!\!\begin{array}{c}\text{(Q)}_p \\ \end{array}\!\!\!\text{(CH}_2)_q\!-\!\underset{R_2}{\overset{}{\text{N}}}\!- \quad \text{(IV b)}$$

wherein Q, $R_2$, p and q have the meaning indicated above.

Preferred dyestuffs of the latter series are those in which
p = 0,
q = 0 and
$R_2$ = H.

Suitable radicals $$\text{D}'\!-\!\underset{R_3}{\overset{}{\text{N}}}\!- \quad \text{(V)}$$

are, in particular, radicals of monoazo or polyazo dyestuffs with a —NH($R_3$) group, which contain sulpho groups and optionally contain metals.

Preferred examples of the dyestuffs of the formula $$\text{D}'\!-\!\underset{R_3}{\overset{}{\text{N}}}\!-\!\text{H} \quad \text{(V a)}$$

on which the radicals (V) are based are those of the following formulae:

1. $[\text{A}\!-\!\text{N}\!=\!\text{N}\!-\!\text{B}]\!\!-\!\!\underset{R_3}{\overset{}{\text{NH}}}$ (VI)

wherein
A = the radical of a heterocyclic or carbocyclic diazo component, preferably of the benzene, naphthalene or triazole series,
B represents the radical of a heterocyclic, carbocyclic or CH-acid coupling component, in particular the radical of a phenol, naphthol, aniline, naphthylamine, 5-aminopyrazole, 5-pyrazolone, pyridone, aminopyridine, acetoacetic acid arylide, indole or pyrimidine which is optionally further substituted, R$_3$ has the meaning indicated above and

is bonded either to the diazo component A or to the coupling component B, and in particular, preferably, to a C atom of an aromatic-carbocyclic or aromatic-heterocyclic ring.

Particularly valuable dyestuffs of this series are those which contain water-soluble groups, such as sulphonic acid groups or carboxyl groups. The azo dyestuffs can be metal-free or can be in the form of metal complexes, copper complexes, chromium complexes and cobalt complexes being preferred.

The metal complex-forming groups, preferably hydroxyl, carboxyl and amino groups, are in the orthoposition relative to the azo group.

The diazo components A and the coupling components B can be substituted, for example by the following substituents: sulpho, nitro, halogen, such as fluorine, chlorine and bromine, C$_1$-C$_4$-alkyl which is optionally substituted by chlorine, C$_1$-C$_4$-alkoxy, hydroxyl or cyano, C$_1$-C$_4$-alkoxy which is optionally substituted by C$_1$-C$_4$-alkoxy, hydroxyl or cyano, C$_1$-C$_4$-alkylmercapto, C$_1$-C$_4$-alkylsulphonyl, phenyl or naphthyl which is optionally substituted by sulpho, amino, C$_1$-C$_4$-alkyl, C$_1$-C$_4$-alkoxy, nitro or halogen, trifluoromethyl, amino, hydroxyl, C$_1$-C$_4$-alkylcarbonylamino, C$_1$-C$_4$-alkylsulphonylamino, benzoylamino or benzenesulphonylamino which is optionally substituted by sulpho, C$_1$-C$_4$-alkyl, C$_1$-C$_4$-alkoxy, nitro or halogen, phenyl-C$_1$-C$_4$-alkyl which is optionally substituted in the phenyl nucleus by sulpho, C$_1$-C$_4$-alkyl, C$_1$-C$_4$-alkoxy, nitro or halogen, phenylazo or naphthylazo which is optionally substituted in the phenyl nucleus or naphthalene nucleus by hydroxyl, amino, sulpho, C$_1$-C$_4$-alkyl, C$_1$-C$_4$-alkoxy, nitro or halogen, C$_1$-C$_4$-alkylcarbonyloxy, benzoyloxy which is optionally substituted by C$_1$-C$_4$-alkyl, C$_1$-C$_4$-alkoxy, nitro or halogen, aminocarbonyl, mono- or di-C$_1$-C$_4$-alkylamino, ureido, carboxyl, cyano, carboxamide or sulphonamide which is optionally substituted on the nitrogen by C$_1$-C$_4$-alkyl, phenyl or benzyl, it being possible for alkyl to be further substituted by sulpho- or sulphato and for phenyl and benzyl to be further substituted by sulpho, C$_1$-C$_4$-alkyl, C$_1$-C$_4$-alkoxy, halogen or nitro, or C$_1$-C$_4$-alkylsulphonylaminosulphonyl or phenylsulphonylaminosulphonyl which is optionally substituted in the phenyl nucleus by methyl, methoxy, chlorine or nitro.

2. 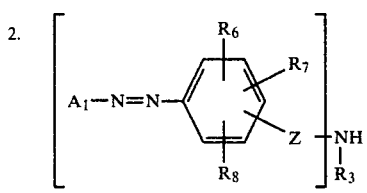 (VII)

wherein

A$_1$ denotes a phenyl or naphthyl radical, which can be substituted by sulpho, carboxyl, nitro, chlorine, C$_1$-C$_4$-alkyl, C$_1$-C$_4$-alkoxy, phenyl or naphthyl which is optionally substituted by sulpho, amino or C$_1$-C$_4$-alkyl, amino, acetylamino, benzyl which is optionally substituted by amino, sulpho or C$_1$-C$_4$-alkyl, phenylazo or naphthylazo which is optionally substituted by amino, C$_1$-C$_4$-alkyl, sulpho, C$_1$-C$_4$-alkoxy or hydroxyl or trifluoromethyl, Z denotes H, hydroxyl, alkoxy which is optionally substituted by hydroxyl or C$_1$-C$_4$-alkoxy or amino which is optionally substituted by C$_1$-C$_4$-alkyl, phenyl or benzyl, it being possible for alkyl to be further substituted by cyano, hydroxyl or C$_1$-C$_4$-alkoxy and for phenyl and benzyl to be further substituted by methyl, methoxy, chlorine, nitro or sulpho, and R$_6$, R$_7$ and R$_8$ independently of one another denote hydrogen, C$_1$-C$_4$-alkyl, C$_1$-C$_4$-alkoxy, amino, C$_1$-C$_4$-alkylcarbonylamino, phenyl which is optionally substituted by C$_1$-C$_4$-alkyl, or amino, hydroxyl or sulpho.

3. 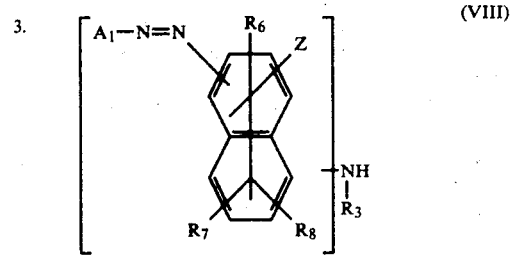 (VIII)

wherein R$_3$, A$_1$, R$_6$, R$_7$, R$_8$ and Z have the abovementioned meaning.

4. 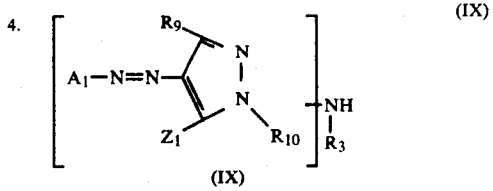 (IX)

wherein

R$_3$ and A$_1$ have the abovementioned meaning,

Z$_1$ denotes amino or hydroxyl,

R$_9$ denotes C$_1$-C$_4$-alkyl, preferably methyl, or carboxyl and

R$_{10}$ denotes phenyl or naphthyl which is optionally substituted by chlorine, C$_1$-C$_4$-alkyl, sulpho, C$_1$-C$_4$-allkoxy or amino.

5. 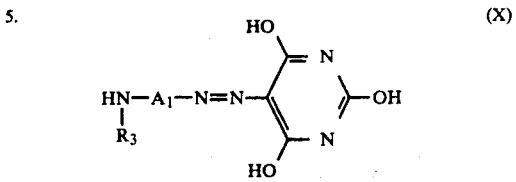 (X)

wherein R$_3$ and A$_1$ have the abovementioned meaning.

6. 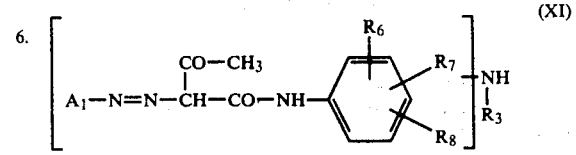 (XI)

wherein $R_3$, $A_1$, $R_6$, $R_7$ and $R_8$ have the abovementioned meaning.

7.

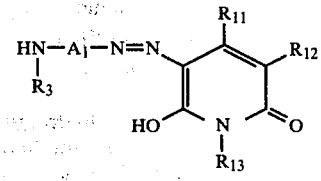

(XII)

wherein
$R_{11}$ denotes $C_1$–$C_4$-alkyl, aryl, carboxyl or hydroxyl,
$R_{12}$ denotes cyano, carboxyl, sulpho, sulpho-$C_1$–$C_4$-alkyl or aminocarbonyl,
$R_{13}$ denotes hydrogen, $C_1$–$C_4$-alkyl, aryl or aralkyl and
$R_3$ and $A_1$ have the abovementioned meaning,

8.

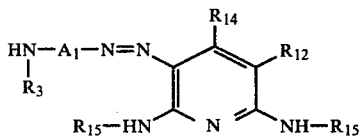

(XIII)

wherein
$R_3$, $R_{12}$ and $A_1$ have the abovementioned meaning,
$R_{14}$ denotes $C_1$–$C_4$-alkyl or amino and
$R_{15}$ denotes hydrogen or $C_1$–$C_4$-alkyl.

Preferred dyestuffs within the formulae (VIII) to (XIII) are those in which $A_1$ denotes the radical of an amine of the formula

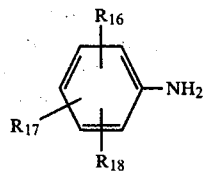

(XIV)

wherein
$R_{16}$ denotes hydrogen, sulpho, hydroxyl, carboxyl or amino,
$R_{17}$ denotes hydrogen, chlorine, nitro, aminosulphonyl,
$C_1$–$C_4$-alkyl, $C_1$–$C_4$-alkoxy, amino, sulpho, hydroxyl or phenylazo or naphthylazo which is optionally substituted in the phenyl or naphthyl nucleus by hydroxyl, sulpho or amino, and
$R_{18}$ denotes hydrogen, chlorine, nitro, $C_1$–$C_4$-alkyl or $C_1$–$C_4$-alkoxy,
and of the formulae

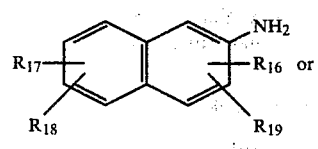

(XV)

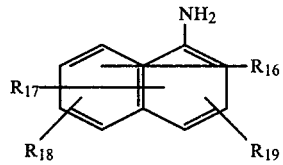

(XVI)

wherein
$R_{16}$, $R_{17}$ and $R_{18}$ have the abovementioned meanings and $R_{19}$ denotes hydrogen, chlorine, nitro, aminosulphonyl,
$C_1$–$C_4$-alkyl, $C_1$–$C_4$-alkoxy, amino, sulpho, hydroxyl or phenylazo or naphthylazo which is optionally substituted in the phenyl or naphthyl nucleus by hydroxyl, sulpho or amino.

Unless indicated otherwise, in the dyestuffs (VI) to (XIII) the group —$NHR_3$ is also bonded to the diazo component or the coupling component, and in particular preferably to a C atom of an aromatic-carbocyclic or aromatic-heterocyclic ring.

The new dyestuffs can be prepared in various ways.

a. Condensation of compounds of the formula

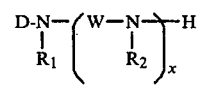

(XVII)

with cyanuric fluoride to give compounds of the formula

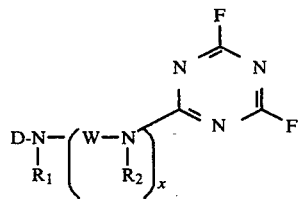

(XVIII)

and subsequent reaction of (XVIII) with V (a).

b. Condensation of (V a) with cyanuric fluoride to give dyestuffs of the formula

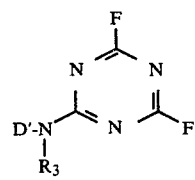

(XIX)

and subsequent reaction of (XIX) with (XVII).

c. Condensation of cyanuric fluoride with coupling components of the formula

K—NH—$R_3$ (XX)

to give compounds of the formula

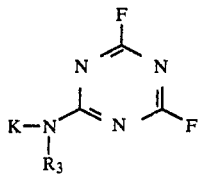

wherein K=the radical of a coupling component, and subsequent condensation of (XXI) with (XVII) and coupling with a diazo component $$D''\text{---}NH_2 \qquad (XXII)$$

wherein D''=an aromatic-carbocyclic or aromatic-heterocyclic radical, in any desired sequence.

Examples of suitable compounds (XVII) are:

1. 1-Amino-4-(3'-aminophenylamino)-anthraquinone-2,4'-disulphonic acid, 1-amino-4-(4'-aminophenylamino)-anthraquinone-2,3'-disulphonic acid, 1-amino-4-(4'-aminophenylamino)-anthraquinone-2,2'-disulphonic acid, 1-amino-4-(4'-methylaminophenylamino)-anthraquinone-2,2'-disulphonic acid, 1-amino-4-(4'-methylaminophenylamino)-anthraquinone-2,3'-disulphonic acid, 1-amino-4-(5'-amino-4'-methyl-phenylamino)-anthraquinone-2,2'-disulphonic acid, 1-amino-4-(5'-amino-2'-methylphenylamino)-anthraquinone-2,4'-disulphonic acid, 1-amino-4-(3'-amino-2'-methylphenylamino)-anthraquinone-2,5'-disulphonic acid, 1-amino-4-(5'-amino-2'-methoxyphenylamino)-anthraquinone-2,4'-disulphonic acid, 1-amino-4-(5'-amino-2',6'-dimethylphenylamino)-anthraquinone-2,4'-and-2,3'-disulphonic acid, 1-amino-4-(5'-amino-2',4',6'-trimethyl-phenylamino)-anthraquinone-2,3'-disulphonic acid, 1-amino-4-(3'-aminophenylamino)-anthraquinone-2-sulphonic acid, 1-amino-4-(4'-aminophenylamino)-anthraquinone-2-sulphonic acid, 1-amino-4-(4'-methylaminophenylamino)-anthraquinone-2-sulphonic acid, 1-amino-4-(3'-amino-2'-methyl-phenylamino)-anthraquinone-2-sulphonic acid, 1-amino-4-(4'-methylaminomethyl-phenylamino)-anthraquinone-2,2'-disulphonic acid, 1-amino-4-(3'-methylaminomethyl-4'-methoxyphenylamino)-2,X'-disulphonic acid, 1-amino-4-(2',6'-dimethyl-3'-methylaminomethyl-phenylamino)-anthraquinone-2,X'-disulphonic acid, 1-amino-4-(3'-aminomethyl-2',6'-dimethyl-phenylamino)-anthraquinone-2,X'-disulphonic acid, 1-amino-4-(5'-aminomethyl-2',4',6'-trimethylphenylamino)-anthraquinone-2,3'-disulphonic acid, 1-amino-4-(6'-aminomethyl-4'-methyl-phenylamino)-anthraquinone-2,2'-disulphonic acid, 1-amino-4-(6'-methylaminomethyl-4'-methylphenylamino)-anthraquinone-2,2'-disulphonic acid, 1-amino-4-(3'-aminomethyl-4'-methyl-phenylamino)-anthraquinone-2,X'-disulphonic acid, 1-amino-4-(5'-aminomethyl-2',6'-diethyl-4'-methyl)-phenylamino-anthraquinone-2,3'-disulphonic acid, 1-amino-4-(4'-aminophenylamino)-anthraquinone-2,6-disulphonic acid and the corresponding -2,7-, -2,5- or -2,8-disulphonic acids, 1-amino-4-(3'-aminophenylamino)-anthraquinone-2,6-disulphonic acid and the corresponding -2,7-, -2,5- or -2,8-disulphonic acids, 1-amino-4-(3'-aminophenylamino)-anthraquinone-2,4',6-trisulphonic acid, 1-amino-4-(4'-aminophenylamino)-anthraquinone-2,3',6-trisulphonic acid, 1-amino-4-(4'-aminophenylamino)-anthraquinone-2,2',6-trisulphonic acid, 1-amino-4-(4'-methylaminomethyl-phenylamino)-anthraquinone-2,3',6-trisulphonic acid, 1-amino-4-(4'-amino-2'-carboxy-phenylamino)-anthraquinone-2-sulphonic acid, 1-amino-4-(4'-amino-2'-carboxy-phenylamino)-anthraquinone-2,6- or -2,7-disulphonic acid, 1-amino-4-(3'-amino-4'-chlorophenylamino)-anthraquinone-2,X'-disulphonic acid, 1-amino-4-(4'-aminocyclohexylamino)-anthraquinone-2-sulphonic acid and 1-amino-4-(4'-aminocyclohexylamino)-anthraquinone-2,5-disulphonic acid and the corresponding -2,6-, -2,7- or -2,8-disulphonic acids.

2. 1-Isopropylamino-5-hydroxy-4-(4'-aminophenylamino)-anthraquinone-2',6-disulphonic acid, 1-isopropylamino-5-hydroxy-4-(4'-aminophenylamino)-anthraquinone-3',6-disulphonic acid, 1-isopropylamino-5-hydroxy-4-(4'-methylaminomethyl-phenylamino)-anthraquinone-2',6-disulphonic acid, 1-isopropylamino-5-hydroxy-4-(4'-aminocyclohexylamino)-anthraquinone-6-sulphonic acid, 1-sec.-butylamino-5-hydroxy-4-(4'-aminophenylamino)-anthraquinone-2',6-disulphonic acid, 1-sec.-butylamino-5-hydroxy-4-(4'-methylaminomethyl-phenylamino)-anthraquinone-2',6-disulphonic acid, 1-methylamino-4-(4'-aminophenylamino)-anthraquinone-2'-sulphonic acid, 1-methylamino-5-hydroxy-(4'-aminophenylamino)-anthraquinone-2',6-disulphonic acid, 1-isopropylamino-5-methoxy-4-(4'-aminophenylamino)-anthraquinone-2'-sulphonic acid, 1-isopropylamino-4-(4'-methylaminophenylamino)-anthraquinone-5-sulphonic acid and 1-isopropylamino-5-hydroxy-4-(3'-methylaminomethyl-4'-methoxy-phenylamino)-anthraquinone-6,X'-disulphonic acid.

Depending on the nature of the starting materials used, the reactions are carried out in an aqueous, aqueous-organic or organic medium at temperatures from $-10°$ to $+40°$, preferably from $0°$ to $+20°$, in the presence of alkaline condensation agents, such as alkali metal bicarbonate solutions, alkali metal carbonate solutions, alkali metal hydroxide solutions, alkali metal hydrogen phosphate solutions, alkali metal phosphate solutions, trialkylamines or N,N-dialkylanilines.

The dyestuffs obtainable by the processes described above can be subjected to further reactions customary for dyestuffs, for example metallisable dyestuffs are treated with agents which donate metals, in particular with chromium salts, cobalt salts, copper salts or nickel salts. Dyestuffs which contain reducible groups, in particular nitro groups, can be reduced and dyestuffs which contain acylatable groups, in particular acylatable amino groups, can be acylated.

The new dyestuffs are valuable products which are suitable for the most diverse application purposes. As water-soluble compounds, they are preferably of interest for dyeing and printing textile materials containing hydroxyl groups and textile materials containing nitrogen, in particular textile materials of natural and regenerated cellulose, and furthermore of wool, silk and synthetic polyamide and polyurethane fibres.

The products are particularly suitable as reactive dyestuffs for dyeing cellulose materials by the techniques known for this dyeing.

The formulae indicated are those of the free acids. In general, the alkali metal salts, which are obtained during the synthesis, and in particular the sodium salts, are employed for dyeing.

EXAMPLE 1

17.7 g of 1-amino-4-(3'-amino-phenylamino)-anthraquinone-2,4'-disulphonic acid are dissolved, at pH 5, in 400 ml of water. After cooling the solution to 0°–5°, 3.1 ml of cyanuric fluoride are slowly added dropwise and the pH value is kept at 4.5 with 2 N sodium carbonate solution. After subsequently stirring the mixture for a short time, a solution, adjusted to pH 6, of 12.1 g of 2-(4'-amino-2'-ureido-phenylazo)-benzenesulphonic acid in 180 ml of water is added to the anthraquinone component. The pH value is further kept at 5.8–6.0 with sodium carbonate solution and the temperature is allowed to rise to 20°. After the reaction had ended, the dyestuff is salted out with 100 g of sodium chloride. The product which has precipitated is filtered off, washed with 15% strength sodium chloride solution and, after making into a paste with 10 ml of 5% strength buffer solution of pH 6, is dried at 60° in a circulating air oven. The dyestuff corresponds to the formula is kept at 4.2–4.7 with 1 N sodium carbonate solution. The mixture is then stirred under the same conditions for 20 minutes.

A neutralised solution of 12.5 g of 2-(4'-amino-2'-ureido-phenylazo)-benzene-1,4-disulphonic acid in 300 ml of water is added dropwise to the resulting solution of the difluorotriazinylanthraquinone dyestuff, and the pH value of the reaction mixture is kept at 6.0–6.5 with 1 N sodium carbonate. After subsequently stirring the mixture for 8 hours, the temperature is allowed to rise gradually to 20° overnight and the dyestuff is then salted out with 8% of sodium chloride. It is filtered off, washed with 10% strength sodium chloride solution and dried at 40° in vacuo.

On cotton, the dyestuff of the formula

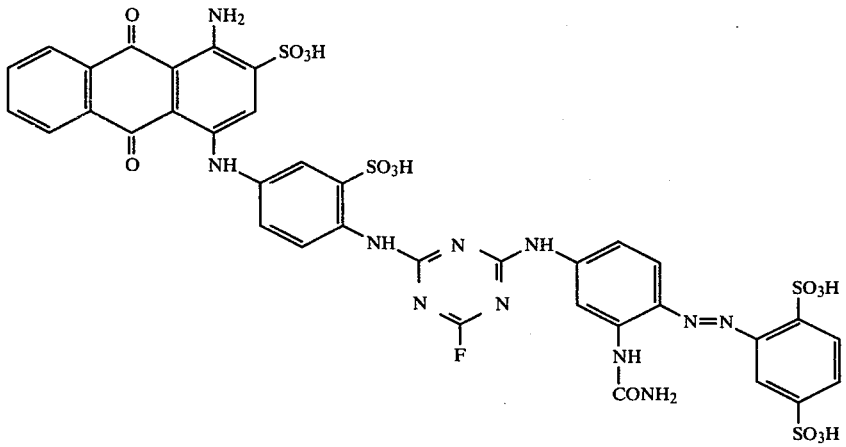

gives, from a long liquor at 40° in accordance with the dyeing process of Example 1, yelowish-tinged green dyeings with good fastness to light and wet processing.

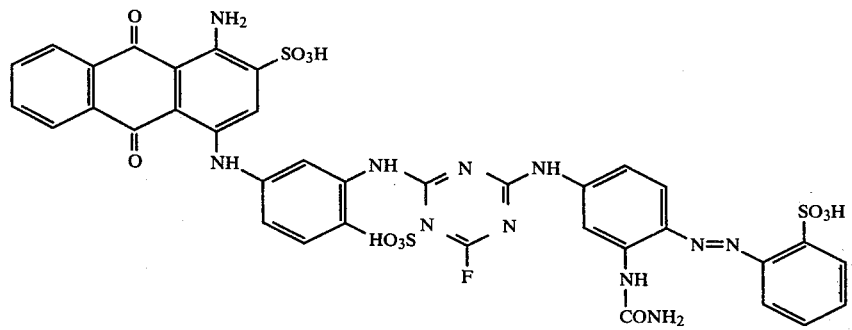

Dyeing instructions 50 g of cotton hanks are dyed in 1 liter of a dye liquor, containing 1.5 g of the above dyestuff, by heating the liquor to 40° in the course of 30 minutes, adding 50 g of sodium sulphate in several portions, then adding 20 g of sodium carbonate and treating the hanks at this temperature for 60 minutes. After rinsing, soaping at the boil and drying, a dyeing is obtained, in a somewhat yellowish-tinged green shade, which is very fast to light, wet processing and chlorine.

EXAMPLE 2

14.7 g of 1-amino-4-(4'-amino-phenylamino)-anthraquinone-2,3'-disulphonic acid are dissolved in 350 ml of water, under neutral conditions. The solution is cooled to 0°–5° and adjusted to pH 4.5, and 3.2 ml of cyanuric fluoride are immediately added dropwise in the course of 10 minutes. The pH value of the solution

EXAMPLE 3

10.0 g of 1-amino-4-(4'-amino-phenylamino)-anthraquinone-2,3'-disulphonic acid are reacted with 2.0 ml of cyanuric fluoride at pH 4.2–4.7 and at 0°–5° in the manner described in Example 2. A solution, adjusted to pH 6.5, of 9.6 g of 3-(2'-acetylamino-4'-amino-phenylazo)-naphthalene-1,5-disulphonic acid in 200 ml of water is added slowly to the resulting solution at 0°–5°. The pH value of the reaction mixture is kept at 5.5–6.0. The temperature is now allowed to rise gradually form 0°–5° to 10°–12° in the course of 20 hours. The reaction has then ended. The dyestuff is salted out of the resulting green solution by adding 10% of sodium chloride at 20°, filtered off, washed with 10% strength sodium chloride solution and dried at 40° in vacuo. The dyestuff, which corresponds to the formula

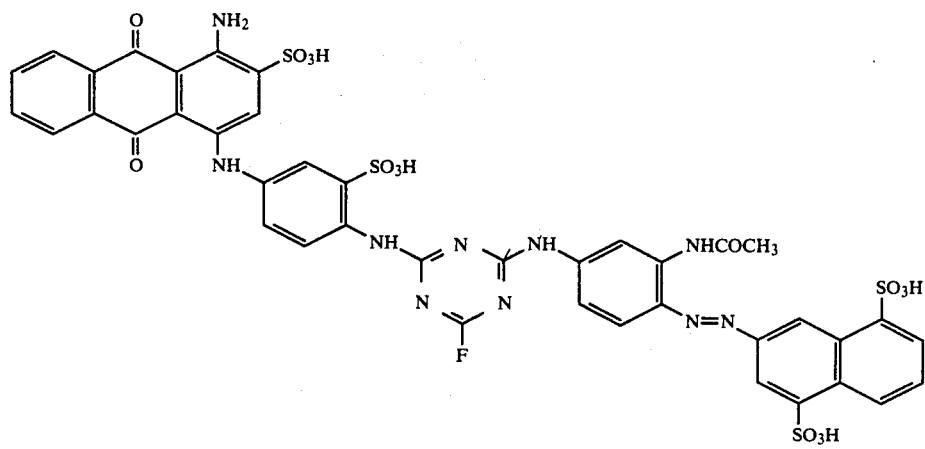

dyes cotton, from a long liquor at 50°, in yellowish-tinged green shades which are fast to light and wet processing.

EXAMPLE 4

10.0 g of 1-amino-4-(4'-amino-phenylamino)-anthraquinone-2,3'-disulphonic acid are dissolved in 250 ml of water and the solution is adjusted to pH 4.5. After cooling the solution to 0°–5°, 2.0 ml of cyanuric fluoride are added dropwise in the course of 10 minutes and the pH value is kept at 4.2–4.7 with 1 N soda. After subsequently stirring the mixture for half an hour, a solution, adjusted to pH 6 and cooled to 0°–5°, of 10.3 g of 7-(4'-amino-2'-ureido-phenylazo)-naphthalene-1,3,6-trisulphonic acid is added and the pH value of the reaction mixture is kept at 6.0 with 1 N sodium carbonate solution. The mixture is stirred under the conditions indicated for 20 hours, then warmed to 20° and subsequently clarified with 2.5 g of charcoal and 2.5 g of kieselguhr, and the dyestuff is salted out with 10% of sodium chloride. The precipitated dyestuff is filtered off, washed with 10% strength sodium chloride solution and dried at 40° in vacuo. The dyestuff of the formula

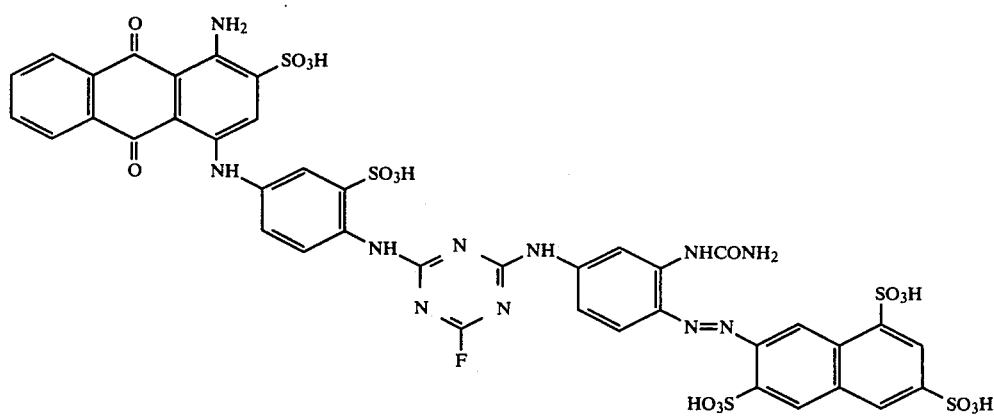

dyes cotton, from a long liquor at 40°–50° in accordance with the process of Example 1, in yellowish-tinged green shades which are fast to light and wet processing.

If the anthraquinone components indicated in Table I, column II are reacted with cyanuric fluoride and the product is then subjected to a condensation reaction in an analogous manner with the azo components listed in column III, further dyestuffs are obtained which dye cotton, from a long liquor, in the colour shades indicated.

TABLE I

| Example No. | II | III | Colour shade |
|---|---|---|---|
| 5 | 1-Amino-4-(3'-amino-phenylamino)-anthraquinone-2,4'-disulphonic acid | 4-(4'-amino-2'-methyl-phenylazo)-benzene-1,3-disulphonic acid | bluish-tinged green |
| 6 | 1-Amino-4-(3'-amino-phenylamino)-anthraquinone-2,4'-disulphonic acid | 4-(4'-amino-2'-ureido-phenylazo)-benzene-1,3-disulphonic acid | yellowish-tinged green |
| 7 | 1-Amino-4-(3'-amino-phenylamino)-anthraquinone-2,4'-disulphonic acid | 3-(4'-amino-2'-methyl-phenylazo)-naphthalene-1,5-disulphonic acid | yellowish-tinged green |
| 8 | 1-Amino-4(3'-amino-phenylamino)-anthraquinone-2,4'-disulphonic acid | 3-(4'-amino-2'-acetylaminophenylazo)-naphthalene-1,5-disulphonic acid | yellowish tinged green |
| 9 | 1-Amino-4-(3'-amino-phenylamino)-anthraquinone-2,4'-disulphonic acid | 3-(4'-amino-2'-ureido-phenylazo)-naphthalene-1,5-disulphonic acid | yellowish-tinged olive |
| 10 | 1-Amino-4-(3'-amino-phenylamino)-anthraquinone-2,4'-disulphonic acid | 4-amino-4'-(4''-methoxy-phenylazo)-stilbene-2,2'-disulphonic acid | yellowish-tinged green |

TABLE I-continued

| Example No. | II | III | Colour shade |
|---|---|---|---|
| 11 | 1-amino-4-(4'-amino-phenylamino)-anthraquinone-2,3'-disulphonic acid | 4-(4'-amino-2'-ureido-phenylazo)-benzene-1,3-disulphonic acid | yellowish-tinged green |
| 12 | 1-amino-4-(4'-amino-phenylamino)-anthraquinone-2,3'-disulphonic acid | 3-(4'-amino-2'-methyl-phenylazo)-naphthalene-1,5-disulphonic acid | green |
| 13 | 1-amino-4-(4'-amino-phenylamino)-anthraquinone-2,3'-disulphonic acid | 3-(4'-amino-2'-ureido-phenylazo)-naphthalene-1,5-disulphonic acid | olive-tinged green |
| 14 | 1-amino-4-(4'-amino-phenylamino)-anthraquinone-2,3'-disulphonic acid | 7-(4'-amino-2'-methyl-phenylazo)-naphthalene-1,3-disulphonic acid | bluish-tinged green |
| 15 | 1-amino-4-(4'-amino-phenylamino)-anthraquinone-2,3'-disulphonic acid | 7-(4'-amino-2'-acetylamino-phenylazo)-naphthalene-1,3-disulphonic acid | yellowish-tinged green |
| 16 | 1-amino-4-(4'-amino-phenylamino)-anthraquinone-2,3'-disulphonic acid | 7-(4'-amino-2'-ureido-phenylazo)-naphthalene-1,3-disulphonic acid | olive-tinged green |
| 17 | 1-amino-4-(4'-amino-phenylamino)-anthraquinone-2,3'-disulphonic acid | 7-(4'-amino-2'-acetylamino-phenylazo)-naphthalene-1,3,6-trisulphonic acid | yellowish-tinged green |
| 18 | 1-amino-4-(4'-amino-phenylamino)-anthraquinone-2,3'-disulphonic acid | 2-(4'-amino-2'-methyl-phenylazo)-benzene-1,4-disulphonic acid | bluish-tinged green |
| 19 | 1-amino-4-(4'-amino-phenylamino)-anthraquinone-2,3'-disulphonic acid | 4-(4'-amino-2'-methyl-phenylazo)-benzene-1,3-disulphonic acid | bluish-tinged green |
| 20 | 1-amino-4-(4'-amino-phenylamino)-anthraquinone-2,3'-disulphonic acid | 2-(4'-amino-2'-ureido-phenylazo)-benzenesulphonic acid | yellowish-tinged green |
| 21 | 1-amino-4-(4'-methylamino-phenylamino)-anthraquinone-2,3'-disulphonic acid | 2-(4'-amino-2'-ureido-phenylazo)-benzene-1,4-disulphonic acid | yellowish-tinged green |
| 22 | 1-amino-4-(4'methylamino-phenylamino)-anthraquinone-2,3'-disulphonic acid | 4-(4'-amino-2'-ureido-phenylazo)-benzene-1,3-disulphonic acid | yellowish-tinged green |
| 23 | 1-amino-4-(5'-amino-2'-methyl-phenylamino)-anthraquinone-2,4'-disulphonic acid | 2-(4'-amino-2'-ureido-phenylazo)-benzene-1,4-disulphonic acid | yellowish-tinged green |
| 24 | 1-amino-4-(5'-amino-2'-methyl-phenylamino)-anthraquinone-2,4'-disulphonic acid | 2-(4'-amino-2'-ureido-phenylazo)-benzenesulphonic acid | yellowish-tinged green |
| 25 | 1-amino-4-(5'-amino-2',4',6'-trimethyl-phenylamino)-anthraquinone-2,3'-disulphonic acid | 2-(4'-amino-2'-ureido-phenylazo)-benzene-1,4-disulphonic acid | yellowish-tinged green |

EXAMPLE 26

10.0 g of 1-amino-4-(4'-amino-phenylamino)-anthraquinone-2,3'-disulphonic acid are dissolved in 250 ml of water, under neutral conditions. 2.0 ml of cyanuric fluoride are added dropwise, in the course of 10 minutes, to the solution, which has been adjusted to pH 4.5 and cooled to 0°–5°, and during this addition the pH value is kept at 4.2–4.7 with 1 N sodium carbonate solution. The mixture is then stirred under the same conditions for a further 20 minutes.

A neutralised solution of 10.5 g of 1-(4'-sulphophenyl)-3-carboxy-4-(5''-amino-2''-sulphophenylazo)-5-pyrazolone in 150 ml of water is now allowed to run into the resulting solution of the difluorotriazinylanthraquinone dyestuff at 0°–5°. The pH value is kept at 5.5–6.0 during this condensation stage. When the reaction has almost ended, after 5–6 hours, the temperature is allowed to rise gradually to 20°, the resulting green dyestuff solution is clarified with 2.5 g of active charcoal and 2.5 g of kieselguhr, and 10% of sodium chloride are introduced into the filtrate. The dyestuff which has precipitated is filtered off, washed with sodium chloride solution and dried at 40° in vacuo.

It corresponds to the formula

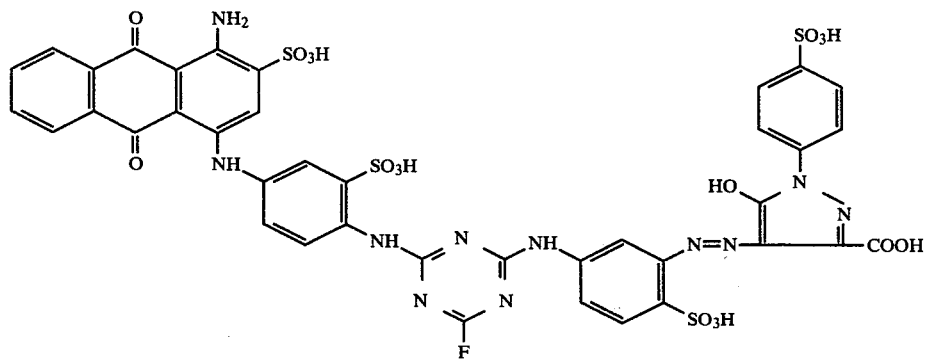

and dyes cotton, from a long liquor at 40° in accordance with the dyeing process indicated in Example 1, in clear, yellowish-tinged green shades. The dyeings have good fastness to light and wet processing.

EXAMPLE 27

9.8 g of 1-amino-4-(3'-amino-phenylamino)-anthraquinone-2,4'-disulphonic acid are dissolved in 150 ml of water. The solution is adjusted to pH 5 and cooled to 0°–5°, and 1.9 ml of cyanuric fluoride are added dropwise in the course of 10 minutes. The pH is kept at 4.5 with 2 N sodium carbonate solution during this addition. After a subsequent stirring time of 15 minutes, a neutralised solution of 11.3 g of 1-(2',5'-dichloro-4'-sulphophenyl)-3-methyl-4-(4''-amino-2''-sulphophenylazo)-5-pyrazolone in 110 ml of water is allowed to run in and the pH value is kept at 6 with sodium carbonate solution. The temperature is now allowed to rise to 20° and, after the reaction has ended, the dyestuff is salted out with potassium chloride. The dyestuff, which corresponds to the formula solution, adjusted to pH 9, of the sodium salt of 3-methyl-4-(5'-amino-2'-sulphophenylazo)-5-pyrazolone in 100 ml of water is added dropwise to the difluorotriazinylanthraquinone component and the pH value of the mixture is kept at 6.0 with 1 N sodium carbonate solution. After subsequently stirring the mixture at 0°–5° for 7 hours, the temperature is allowed to rise gradually to 15°–20° in the course of 10 hours. The dyestuff is salted out with sodium chloride, filtered off and washed with 5% strength sodium chloride solution.

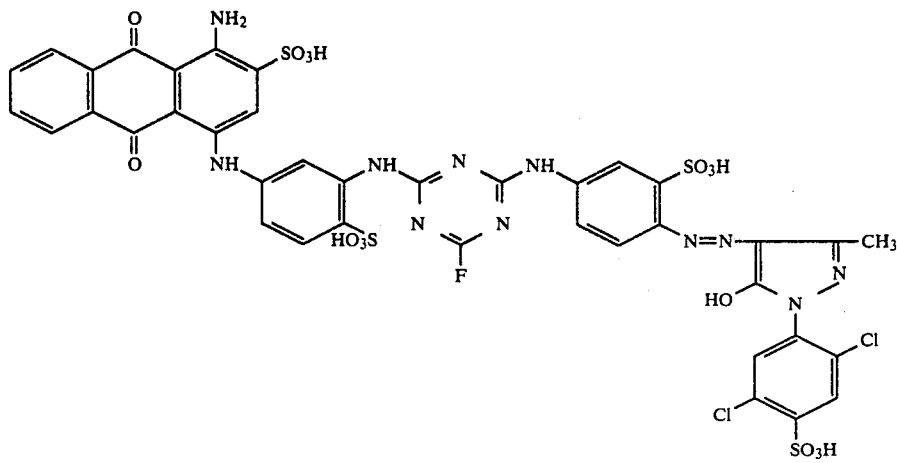

is filtered off, washed with potassium chloride solution and, after adding 10 ml of 5% strength buffer solution (pH=6.0), is dried at 60° in vacuo.

The dyestuff dyes cotton, from a long liquor in accordance with the process described in Example 1, in olive-green shades.

EXAMPLE 28

10.0 g of 1-amino-4-(4'-amino-phenylamino)-anthraquinone-2,3'-disulphonic acid in 250 ml of water are reacted with 2.0 ml of cyanuric fluoride, as described in the preceding Example 26. An equimolar It is dried at 40° in vacuo.
The dyestuff of the formula

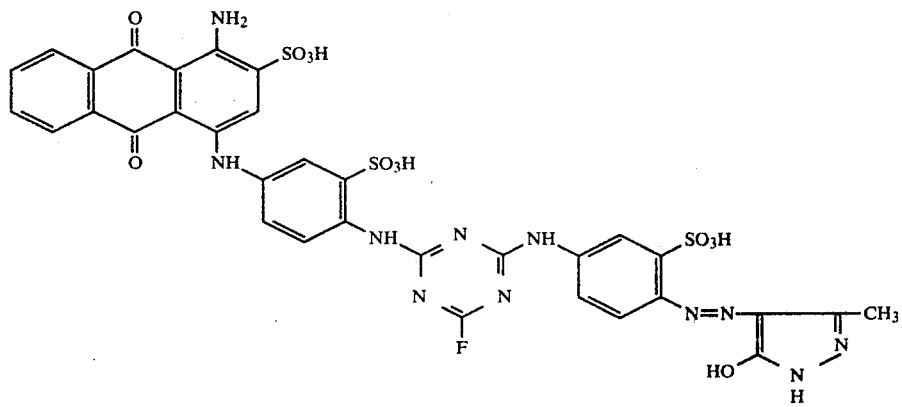

dyes cotton, from a long liquor at 40°, in somewhat bluish-tinged green shades which have good fastness to light and wet processing.

Further dyestuffs which dye cotton, from a long liquor, in the shades indicated in Table II are obtained when the anthraquinone components of column II are first subjected to a condensation reaction with cyanuric fluoride and the condensation product is subjected to a further condensation reaction with the azo components of column III.

TABLE II

| Example No. | II | III | Colour shade |
|---|---|---|---|
| 29 | 1-amino-4-(3'-amino-phenylamino)-anthraquinone-2,4'-disulphonic acid | 3-methyl-4-(4'-amino-2'-sulphophenylazo)-5-pyrazolone | green |
| 30 | 1-amino-4-(3'-amino-phenylamino)-anthraquinone-2,4'-disulphonic acid | 3-methyl-4-(5'-amino-2'-sulphophenylazo)-pyrazolone | olive-tinged green |
| 31 | 1-amino-4-(3'-amino-phenylamino)- | 1-phenyl-3-methyl-4-(5'-amino-2'- | yellowish- |

TABLE II-continued

| Example No. | II | III | Colour shade |
|---|---|---|---|
|  | anthraquinone-2,4'-disulphonic acid | sulphophenylazo)-5-pyrazolone | tinged green |
| 32 | 1-amino-4-(3'-amino-phenylamino)-anthraquinone-2,4'-disulphonic acid | 1-(2',5'-dichloro-4'-sulphophenylazo)-3-methyl-4-(5''-amino-2''-sulphophenyl-azo)-5-pyrazolone | green |
| 33 | 1-amino-4-(3'-amino-phenylamino)-anthraquinone-2,4'-disulphonic acid | 1-(4'-sulphophenyl)-3-carboxy-4-(5''-amino-2''-sulpho-phenylazo)-5-pyrazolone | yellowish tinged green |
| 34 | 1-amino-4-(3'-amino-phenylamino)-anthraquinone-2,4'-disulphonic acid | 1-(4'-sulphophenyl)-3-carboxy-4-(4''-amino-2''-sulpho-phenylazo)-5-pyrazolone | khaki |
| 35 | 1-amino-4-(3'-amino-phenylamino)-anthraquinone-2,4'-disulphonic acid | 1-(4'-aminophenyl)-3-methyl-4-(2'',5''-disulpho-phenylazo)-5-pyrazolone | green |
| 36 | 1-amino-4-(3'-amino-phenylamino)-anthraquinone-2,4'-disulphonic acid | 1-(4'-aminophenyl)-3-methyl-4-(1'',5''-disulpho-2''-naphthyl)-5-pyrazolone | yellowish-tinged green |
| 37 | 1-amino-4-(4'-amino-phenylamino)-anthraquinone-2,3'-disulphonic acid | 1-(2',5',-dichloro-4'-sulphophenyl)-3-methyl-4-(5''-amino-2''-sulpho-phenylazo)-5-pyrazolone | yellowish-tinged green |
| 38 | 1-amino-4-(4'-amino-phenylamino)-anthraquinone-2,3'-disulphonic acid | 1-(2',5'-dichloro-4'-sulphophenyl)-3-methyl-4-(4''-amino-2''-sulphophenyl-azo)-5-pyrazolone | olive-tinged green |
| 39 | 1-amino-4-(4'-amino-phenylamino)-anthraquinone-2,3'-disulphonic acid | 1-(1',3'-disulpho-7'-naphthyl)-3-methyl-4-(5''-amino-2''-sulphophenyl-azo)-5-pyrazolone | green |
| 40 | 1-amino-4-(4'-amino-phenylamino)-anthraquinone-2,3'-disulphonic acid | 1-(4'-sulphophenyl)-3-carboxy-4-(4''-amino-2''-sulpho-phenylazo)-5-pyrazolone | olive-green |
| 41 | 1-amino-4-(4'-amino-phenylamino)-anthraquinone-2,3'-disulphonic acid | 3-methyl-4-(4'-amino-2'-sulpho-phenylazo)-5-pyrazolone | yellowish-tinged green |
| 42 | 1-amino-4-(5'-amino-2'-methoxy-phenylamino)-anthraquinone-2,4'-disulphonic acid | 1-(4'-sulphophenyl)-3-carboxy-4-(4''-amino-2''-sulpho-phenylazo)-5-pyrazolone | olive-green |
| 43 | 1-amino-4-(5'-amino-2',4',6'-trimethyl-phenylamino)-anthraquinone-2,3'-disulphonic acid | 1-(4'-sulphophenyl)-3-carboxy-4-(5''-amino-2''-sulphophenylazo)-5-pyrazolone | yellowish-tinged green |
| 44 | 1-amino-4-(5'-amino-2'-methyl-phenylamino)-anthraquinone-2,4'-disulphonic acid | 1-(4'-sulphophenyl)-3-carboxy-4-(5''-amino-2''-sulphophenylazo)-5-pyrazolone | yellowish-tinged green |

EXAMPLE 45

9.0 g of 2-(4'-amino-2'-ureido-phenylazo)-benzene-1,4-disulphonic acid are dissolved, at pH 5.8, in 450 ml of water and the solution is cooled to 0°–5°. 2.0 ml of cyanuric fluoride are added dropwise to this solution in the course of 10 minutes, and during this addition the pH is kept between 4.2 and 4.7 with 1 N sodium carbonate solution. In order to bring the reaction to completion, the mixture is subsequently stirred at 0°–5° and at a pH of 4.5 for a further 30 minutes. The resulting solution of the dichlorotriazinylazo dyestuff is added to a solution, adjusted to pH 6, of 10.0 of 1-amino-4-(3'-amino-2'-methyl-phenylamino)-anthraquinone-2,5'-disulphonic acid in 150 ml of water in the course of 30 minutes. During this addition, the temperature is further kept at 0°–5° and the pH value is kept at 5.8–6.0 with sodium carbonate solution. After 6 hours, the green solution is warmed to 20° and subsequently stirred at this temperature and at a pH value of 7 for 2 hours, and the dyestuff is then salted out with 200 g of sodium chloride. The dyestuff of the formula

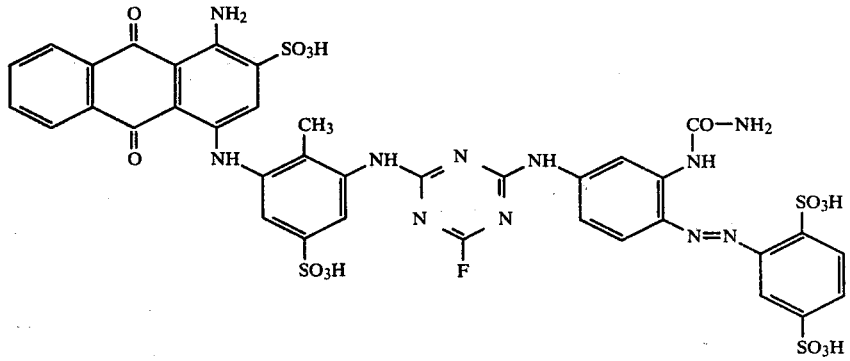

which has precipitated in the form of the sodium salt, is filtered off, washed with saturated sodium chloride solution and dried at 40° in vacuo. It dyes cotton, from a long liquor in accordance with the dyeing process indicated in Example 1, in green shades which are fast to light and wet processing.

EXAMPLE 46

9.0 g of 2-(4'-amino-2'-ureido-phenylazo)-benzene-1,4-disulphonic acid are reacted with 2.0 ml of cyanuric fluoride in the manner described in Example 45.

The resulting solution of the difluorotriazinylazo dyestuff is added, in the course of 15 minutes, to a solution of an anthraquinone dyestuff, which has been prepared by dissolving 8.0 g of 1-amino-4-(3'-amino-2'-methyl-phenylamino)-anthraquinone-2-sulphonic acid in 150 ml of water at pH 7 and cooling the solution to 0°–5°. During the dropwise addition, the pH value of the mixture is kept at 6.0–6.5 and the mixture is then stirred under the same conditions for a further 15 hours. During this time, the temperature is allowed to rise gradually to 20°, the resulting green solution is clarified with 2 g of charcoal and 2 g of kieselguhr and the dyestuff is salted out of the filtrate by adding 10% of sodium chloride. The product which has precipitated is filtered off, washed with 10% strength sodium chloride solution and dried at 40° in vacuo.

On cotton, the resulting dyestuff of the formula

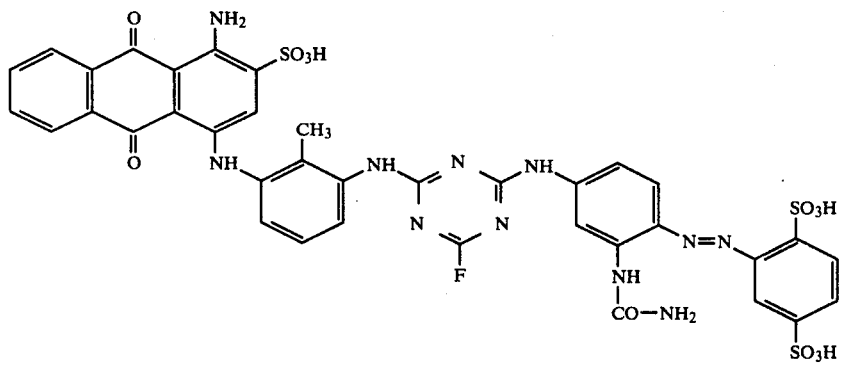

gives, from a long liquor at 40° in accordance with Example 1, strong green dyeings with good fastness to light and wet processing.

EXAMPLE 47

14.3 g of 2-(4'-amino-2'-ureido-phenylazo)-benzene-1,4-disulphonic acid in 450 ml of water are reacted with 3.2 ml of cyanuric fluoride at 0°–5° and at pH 4.2–4.7 in the manner described in Example 45. The resulting difluorotriazinylazo dyestuff solution is allowed to run into a neutralised solution of 15.1 g of 1-amino-4-(4'-methylaminophenylamino)-anthraquinone-2,2'-disulphonic acid in 150 ml of water at 0°–5° in the course of 20 minutes, and the pH value of the reaction mixture is kept at 6.0–6.3 with 1 N sodium carbonate solution. When the reaction has ended, after 2 hours, the mixture is warmed to 20° and the resulting green dyestuff is salted out with 7% of sodium chloride. It is filtered off, washed with 10% strength sodium chloride solution and dried at 40° in vacuo.

The dyestuff of the formula

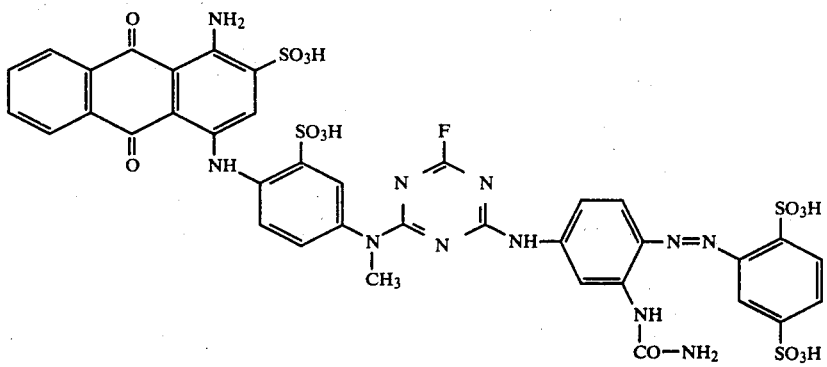

dyes cotton, from a long liquor at 40°, in yellowish-tinged green shades which are distinguished by good fastness to light and wet processing and, in particular, also fastness to chlorine.

If the azo components indicated in Table III, column II are reacted in the same manner with cyanuric fluoride and the reaction product is further reacted with the anthraquinone components listed in column III, similar dyestuffs which dye cotton green from a long liquor are obtained.

Table III, see pages 27+28

TABLE III

| Example No. | II | III |
|---|---|---|
| 48 | 4-(4'-amino-2'-ureido-phenylazo)-benzene-1,3-disulphonic acid | 1-amino-4-(3'-amino-2'-methyl-phenylamino)-anthraquinone-2,5'-disulphonic acid |
| 49 | 2-(4'-amino-2'-ureido-phenylazo)- | 1-amino-4-(3'-amino-2'-methyl-phenyl- |

TABLE III-continued

| Example No. | II | III |
|---|---|---|
|  | benzenesulphonic acid | amino)-anthraquinone-2,5'-disulphonic acid |
| 50 | 4-(4'-amino-2'-ureido-phenylazo)-benzene-1,3-disulphonic acid | 1-amino-4-(4'-amino-phenylamino)-anthraquinone-2,2'-disulphonic acid |
| 51 | 2-(4'-amino-2'-ureido-phenylazo)-benzene-1,4-disulphonic acid | 1-amino-4-(4'-amino-phenylamino)-anthraquinone-2,2'-disulphonic acid |
| 52 | 2-(4'-amino-2'-ureido-phenylazo)-benzene-1,4-disulphonic acid | 1-amino-4-(4'-amino-phenylamino)-anthraquinone-2,2',6-trisulphonic acid |
| 53 | 4-(4'-amino-2'-ureido-phenylazo)-benzene-1,3-disulphonic acid | 1-amino-4-(4'-methylamino-phenylamino)-anthraquinone-2,2'-disulphonic acid |
| 54 | 4-(4'-amino-2'-ureido-phenylazo)-benzene-1,3-disulphonic acid | 1-amino-4-(3'-amino-2'-methyl-phenylamino)-anthraquinone-2-sulphonic acid |
| 55 | 2-(2'-acetylamino-4'-aminophenyl-azo)-benzene-1,4-disulphonic acid | 1-amino-4-(3'-amino-2'-methyl-phenylamino)-anthraquinone-2-sulphonic acid |
| 56 | 2-(2'-acetylamino-4'-aminophenyl-azo)-benzene-1,4-disulphonic acid | 1-amino-4-(3'-amino-2'-methyl-phenyl-amino)-anthraquinone-2,5'-disulphonic acid |
| 57 | 2-(2'-acetylamino-4'-aminophenyl-azo)-benzenesulphonic acid | 1-amino-4-(4'-amino-phenylamino)-anthraquinone-2,2',6-trisulphonic acid |
| 58 | 2-(4'-amino-2'-methyl-phenylazo)-benzene-1,5-disulphonic acid | 1-amino-4-(3'-amino-2'-methyl-phenylamino)-anthraquinone-2-sulphonic acid |
| 59 | 2-(4'-amino-2'-methyl-phenylazo)-benzene-1,5-disulphonic acid | 1-amino-4-(4'-amino-phenylamino)-anthraquinone-2,2'-disulphonic acid |
| 60 | 4-(4'-amino-2'-methyl-phenylazo)-benzenesulphonic acid | 1-amino-4-(4'-methylamino-phenylamino)-anthraquinone-2,2'-disulphonic acid |
| 61 | 2-(4'-amino-2'-ureido-phenylazo)-benzene-1,4-disulphonic acid | 1-amino-4-(4'-amino-cyclohexylamino)-anthraquinone-2-sulphonic acid |
| 62 | 4-(4'-amino-2'-ureido-phenylazo)-benzene-1,3-disulphonic acid | 1-amino-4-(4'-amino-cyclohexylamino)-anthraquinone-2-sulphonic acid |
| 63 | 2-(4'-amino-2'-ureido-phenylazo)-benzene-1,4-disulphonic acid | 1-amino-4-(4'-carboxymethylamino-phenyl-amino)-anthraquinone-2-sulphonic acid |
| 64 | 2-(4'-amino-2'-ureido-phenylazo)-benzene-1,4-disulphonic acid | 1-amino-4-(4'-amino-2'-carboxyphenyl-amino)-anthraquinone-2-sulphonic acid |

EXAMPLE 65

10.5 g of 1-(4'-sulphophenyl)-3-carboxy-4-(5''-amino-2''-sulphophenylazo)-5-pyrazolone are dissolved, at pH 8–9, in 300 ml of water. After cooling the solution to 0°–5°, the pH value is adjusted to 4.8 and dropwise addition of 1.8 ml of cyanuric fluoride is strated immediately. The pH value is kept at 3.7–4.2 with 1 N sodium carbonate solution during the dropwise addition of the cyanuric fluoride, and the addition of the reactive component is ended within 5–10 minutes. The condensation reaction is then brought to completion in the course of 30 minutes by subsequently stirring the mixture, a pH value of 4.2 being maintained.

The resulting solution of the difluorotriazinylazo dyestuff is now added dropwise to a neutralised solution of 10.0 g of 1-amino-4-(4'-amino-phenylamino)-anthraquinone-2,2'-disulphonic acid in 200 ml of water at 0°–5° in the course of 15 minutes, and during this addition the pH value of the mixture is kept at 6.3–6.5.

When the condensation reaction between the difluorotriazinylazo dyestuff and the aminoanthraquinone component has ended, after about 2 hours, the mixture is warmed to 20°, the solution is clarified with 2.5 g of charcoal and 2.5 g of kieselguhr and the resulting filtrate is salted out with sodium chloride. The resulting dyestuff is filtered off, washed with sodium chloride solution and dried at 40° in vacuo. It corresponds to the formula

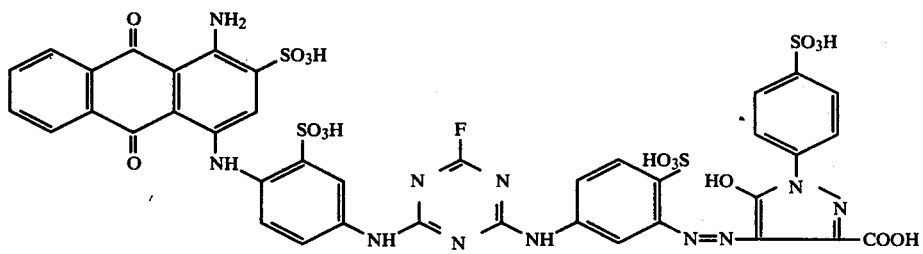

and dyes cotton, from a long liquor at 40°, in clear, yellowish-tinged green shades with good fastness to light and wet processing.

If the azo components indicated in Table IV, column II are subjected to an analogous condensation reaction with cyanuric fluoride and the resulting intermediate products are then subjected to a condensation reaction with the anthraquinone components of column III, further dyestuffs are obtained which dye cotton, from a long liquor, in the colour shades indicated.

TABLE IV

| Example No. | II | III | Colour shade |
|---|---|---|---|
| 66 | 1-(2',5'-dichloro-4'-sulphophenyl)-3-methyl-4-(5''-amino-2''-sulpho-phenylazo)-5-pyrazolone | 1-amino-4-(4'-amino-phenylamino)-anthraquinone-2,2'-disulphonic acid | green |

TABLE IV-continued

| Example No. | II | III | Colour shade |
|---|---|---|---|
| 67 | 1-(2',5'-dichloro-4'-sulphophenyl)-3-methyl-4-(5''-amino-2''-sulphophenylazo)-5-pyrazolone | 1-amino-4-(3'-amino-2'-methyl-phenylamino)-anthraquinone-2,5'-disulphonic acid | green |
| 68 | 1-(2',5'-dichloro-4'-sulphophenyl)-3-methyl-4-(5''-amino-2''-sulphophenylazo)-5-pyrazolone | 1-amino-4-(4'-amino-cyclohexylamino)-anthraquinone-2-sulphonic acid | green |
| 69 | 1-(4'-sulphophenyl)-3-carboxy-4-(5''-amino-2''-sulphophenylazo)-5-pyrazolone | 1-amino-4-(3'-amino-2'-methyl-phenylamino)-anthraquinone-2,5'-disulphonic acid | green |
| 70 | 1-(4'-sulphophenyl)-3-carboxy-4-(4''-amino-2''-sulphophenylazo)-5-pyrazolone | 1-amino-4-(4'-amino-phenylamino)-anthraquinone-2,2'-disulphonic acid | olive |
| 71 | 1-(4'-sulphophenyl)-3-carboxy-4-(4''-amino-2''-sulphophenylazo)-5-pyrazolone | 1-amino-4-(4'-methylamino-phenyl-amino)-anthraquinone-2,2'-disulphonic acid | olive |
| 72 | 1-(4'-sulphophenyl)-3-carboxy-4-(4''-amino-2''-sulphophenylazo)-5-pyrazolone | 1-amino-4-(3'-amino-2'-methyl-phenylamino)-anthraquinone-2,5'-disulphonic acid | olive |
| 73 | 1-(1',3'-disulpho-7'-naphthyl)-3-methyl-4-(5''-amino-2''-sulphophenylazo)-5-pyrazolone | 1-amino-4-(4'-amino-phenylamino)-anthraquinone-2,2'-disulphonic acid | green |
| 74 | 1-(1',5'-disulpho-7'-naphthyl)-3-methyl-4-(4''-amino-2''-sulphophenylazo)-5-pyrazolone | 1-amino-4-(4'-methylamino-phenyl-amino)-anthraquinone-2,2'-disulphonic acid | olive-tinged green |
| 75 | 1-(1',3'-disulpho-7'-naphthyl)-3-methyl-4-(4''-amino-2''-sulphophenylazo)-5-pyrazolone | 1-amino-4-(3'-amino-2'-methyl-phenyl-amino)-anthraquinone-2,5'-disulphonic acid | olive-tinged green |
| 76 | 1-(1',3'-disulpho-7'-naphthyl)-3-methyl-4-(4''-amino-2''-sulphophenylazo)-5-pyrazolone | 1-amino-4-(4'-amino-phenylamino)-anthraquinone-2,2'-disulphonic acid | olive-tinged green |
| 77 | 1-(2',5'-dichloro-4'-sulphophenyl)-3-methyl-4-(4''-amino-2''-sulphophenylazo)-5-pyrazolone | 1-amino-4-(4'-amino-phenylamino)-anthraquinone-2,2'-disulphonic acid | olive-tinged green |
| 78 | 1-(2',5'-dichloro-4'-sulphophenyl)-3-methyl-4-(4''-amino-2''-sulphophenylazo)-5-pyrazolone | 1-amino-4-(3'-amino-2'-methyl-phenyl-amino)-anthraquinone-2,5'-disulphonic acid | olive-tinged green |
| 79 | 3-methyl-4-(5'-amino-2'-sulpho-phenylazo)-5-pyrazolone | 1-amino-4-(4'-amino-phenylamino)-anthraquinone-2,2'-disulphonic acid | green |
| 80 | 3-methyl-4-(5'-amino-2'-sulpho-phenylazo)-5-pyrazolone | 1-amino-4-(4'-amino-phenylamino)-anthraquinone-2,2',7-trisulphonic acid | green |
| 81 | 1-(2'-methyl-4'-sulphophenyl)-3-carboxy-4-(5''-amino-2''-sulpho-phenylazo)-5-pyrazolone | 1-amino-4-(4'-amino-phenylamino)-anthraquinone-2,2'-disulphonic acid | green |
| 82 | 1-(2'-chloro-6'-methyl-4'-sulpho-phenyl)-3-carboxy-4-(5''-amino-2''-sulphophenylazo)-5-pyrazolone | 1-amino-4-(3'-amino-2'-methyl-phenyl-amino)-anthraquinone-2,5'-disulphonic acid | green |
| 83 | 1-(3'-sulphophenyl)-3-methyl-5-pyrazolonimide | 1-amino-4-(3'-amino-2'-methyl-phenyl-amino)-anthraquinone-2,5'-disulphonic acid | green |
| 84 | 1-(3'-sulphophenyl)-3-methyl-5-pyrazolonimide | 1-amino-4-(4'-amino-phenylamino)-anthraquinone-2,2'-disulphonic acid | green |
| 85 | 1-(3'-aminophenyl)-3-methyl-4-(2'',5''-disulphophenylazo)-5-pyrazolone | 1-amino-4-(4'-amino-phenylamino)-anthraquinone-2,2'-disulphonic acid | green |
| 86 | 1-(4'-aminophenyl)-3-methyl-4-(2'',4''-disulphophenylazo)-5-pyrazolone | 1-amino-4-(3'-amino-2'-methyl-phenyl-amino)-anthraquinone-2-sulphonic acid | green |
| 87 | 1-(2'-methyl-4'-sulphophenyl)-3-methyl-4-(4''-amino-2''-sulphophenyl-azo)-5-pyrazolone | 1-amino-4-(4'-amino-phenylamino)-anthraquinone-2,5-disulphonic acid | olive-tinged green |

EXAMPLE 88

9.0 g of 2-(4'-amino-2'-ureido-phenylazo)-benzene-1,4-disulphonic acid are dissolved, at pH 5.5, in 315 ml of water and the solution is cooled to 0°–5°. 2.4 ml of cyanuric fluoride are added dropwise to this solution in the course of 10 minutes, and the pH value is thus kept between 4.2 and 4.7 by adding 2 N sodium carbonate solution dropwise. In order to bring the reaction to completion, the mixture is subsequently stirred at 0°–5° and at a pH value of 4–5 for a further 30 minutes.

The resulting solution of the difluorotriazinyl-azo dyestuff is added dropwise to a solution, adjusted to pH 7 and initially warmed to 20°–25° C., of 10 g of 1-amino-4-(4'-methyl-2'-aminomethyl-anilino)-anthraquinone-2,6'-disulphonic acid in 100 ml of water in the course of 30 minutes, the pH value being kept between 6.5 and 7 by adding 2 N sodium hydroxide solution dropwise. As a result of the cold azo dyestuff solution running in, the temperature thereby falls to 15°–18°. The green solution is subsequently stirred for a further 30 minutes and the dyestuff is then salted out with 42 g of sodium chloride in the course of one hour. The dyestuff, which has crystallised out in small prisms and has, as the free acid, the following formula

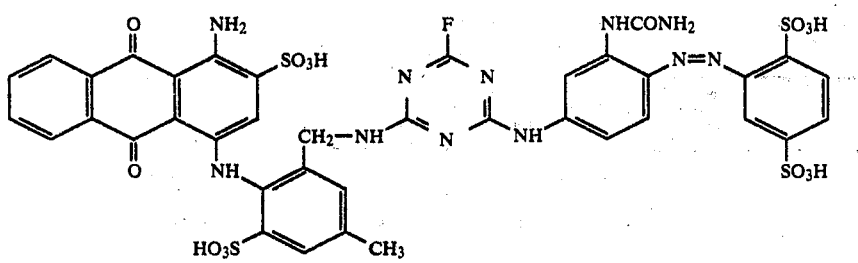

is filtered off, washed with 10% strength NaCl solution and dried at 40° in vacuo.

Printing Instructions:

A paste is prepared from 40 g of the above dyestuff, 500 g of alginate thickener, 20 g of sodium bicarbonate, 10 g of sodium nitrobenzene-3-sulphonate and 300 g of water and is then made up to 1 kg with water. A cotton fabric is printed with this paste, dried, steamed at 105° for 8 minutes, rinsed with hot water, then soaped at the boil, rinsed and dried. A green print with very good fastness properties is obtained.

EXAMPLE 89

If the anthraquinone component indicated in Example 88 is replaced by the same amount of 1-amino-4-(4'-N-Methylaminomethylanilino)-anthraquinone-2,2'-disulphonic acid and the procedure is otherwise as described, a green dyestuff which, as the free acid, corresponds to the formula

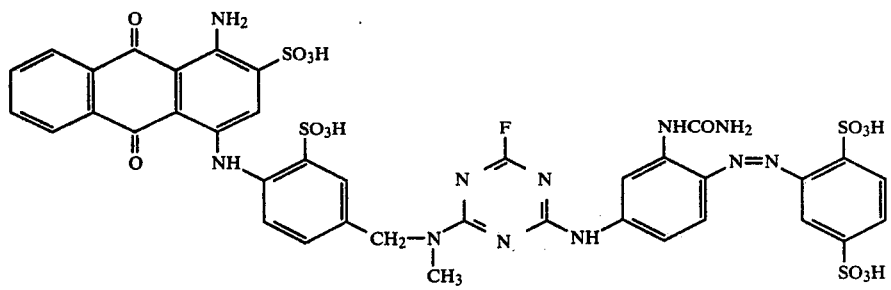

is obtained.

It dyes cellulose fibres, in accordance with the process indicated in Example 1, in bluish-tinged green shades of very good fastness to light, wet processing and chlorine.

Further examples are listed in Table V which follows:

TABLE V

| Example No. | II | III | Colour shade |
|---|---|---|---|
| 90 | 2-(4'-amino-2'-ureido-phenylazo)-benzene-1,4-disulphonic acid | 1-amino-4-(3'-methyl-aminomethyl-4'-methoxy-phenylamino)-anthraquinone-2,X'-disulphonic acid | yellowish-tinged green |
| 91 | 1-(2',5'-dichloro-4'-sulpho-phenyl)-3-methyl-4-(3''-amino-2''-sulphophenylazo)-5-pyrazolone | 1-amino-4-(4'-methyl-6'-aminomethyl-phenylamino-anthraquinone-2,2'-disulphonic acid | bluish-tinged green |
| 92 | 1-(2',5'-dichloro-4'-sulpho-phenyl)-3-methyl-4-(3''-amino-2''-sulphophenylazo)-5-pyrazolone | 1-amino-4-(4'-methyl-aminomethyl-phenylamino)-anthraquinone-2,2'-disulphonic acid | bluish-tinged green |
| 93 | 1-(2',5'-dichloro-4'-sulpho-phenyl)-3-methyl-4-(4''-amino-2''-sulphophenylazo)-5-pyrazolone | 1-amino-4-(4'-methyl-aminomethyl-phenylamino)-anthraquinone-2,2'-disulphonic acid | olive-green |
| 94 | 1-(2',5'-dichloro-4'-sulpho-phenyl)-3-methyl-4-(4''-amino-2''-sulphophenylazo)-5-pyrazolone | 1-amino-4-(4'-methyl-6'-aminomethyl-phenylamino)-anthraquinone-2,2'-disulphonic acid | olive |
| 95 | 2-(4'-amino-2'-methylphenylazo)-naphthalene-4,8-disulphonic acid | 1-amino-4-(4'-methyl-6'-aminomethyl-phenylamino)-anthraquinone-2,2'-disulphonic acid | bluish-tinged green |
| 96 | 2-(4'-amino-2'-methylphenylazo)-naphthalene-4,8-disulphonic acid | 1-amino-4-(4'-methyl-aminomethyl-phenylamino)-anthraquinone-2,2'-disulphonic acid | bluish-tinged green |
| 97 | 2-(5'-amino-2'-sulpho-phenylazo)-1-hydroxy-7-(3''-sulpho-phenyl-amino)-naphthalene-3-sulphonic acid | 1-amino-4-(4'-methyl-aminomethyl-phenylamino)-anthraquinone-2,2'-disulphonic acid | black |
| 98 | 2-(5'-amino-2'-sulpho-phenylazo)-1-hydroxy-7-(3''-sulpho-phenyl-amino)-naphthalene-3-sulphonic acid | 1-amino-4-(4'-methyl-6'-aminomethyl-phenylamino)-anthraquinone-2,2'-disulphonic acid | black |
| 99 | 4-(4'-amino-2'-ureido-phenylazo-benzene)-1,3-disulphonic acid | 1-amino-4-(4'-methyl-6'-aminomethyl-phenylamino)-anthraquinone-2,2'-disulphonic acid | green |

TABLE V-continued

| Example No. | II | III | Colour shade |
|---|---|---|---|
| 100 | 4-(4'-amino-2'-ureido-phenylazo-benzene)-1,3-disulphonic acid | 1-amino-4-(4'-methyl-aminomethyl-phenylamino)-anthraquinone-2,2'-disulphonic acid | bluish-tinged green |

EXAMPLE 101

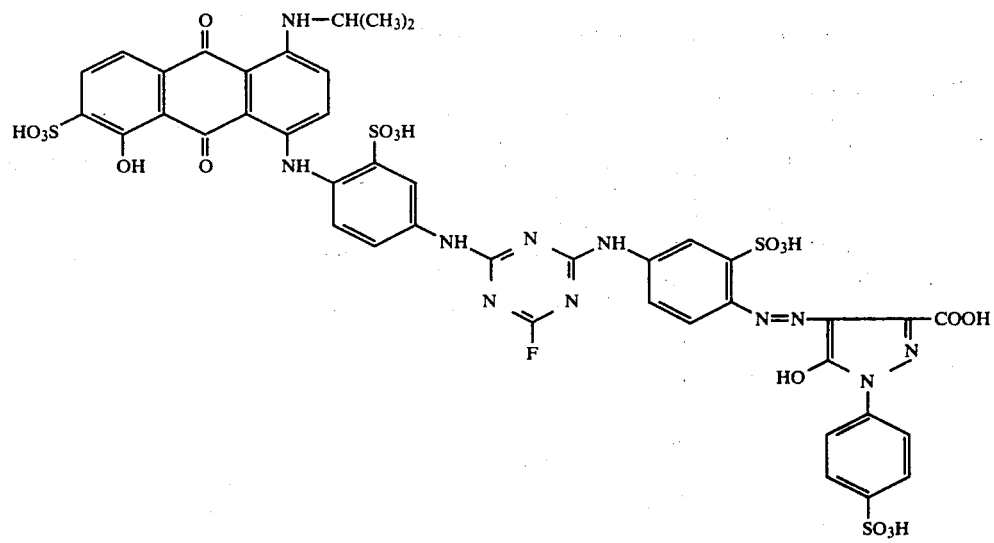

9.7 g of 1-(4'-sulphophenyl)-3-carboxy-4-(4'-amino-2'-sulphophenylazo)-5-pyrazolone in the form of the sodium salt are dissolved in 200 ml of water. The solution is adjusted to pH 6 and cooled to 0°-5°, and 1.8 ml of cyanuric fluoride are slowly added dropwise at this temperature; during this addition, the pH value is kept at 4–4.5 by simultaneously adding 20% strength sodium carbonate solution dropwise. The mixture is subsequently stirred at 0°-5° for some time.

A solution of 12.5 g of 1-isopropylamino-4-(4'-amino-phenylamino)-5-hydroxy-anthraquinone-2',6-disulphonic acid (potassium salt) in 200 ml of water is then added dropwise. The pH value is kept at 5.5 with sodium carbonate solution during the dropwise addition. The pH value is then kept at 6.0 and the temperature is allowed to rise gradually to 20°-25°. After the condensation reaction has ended, the dyestuff of the formula is salted out with 80 g of sodium chloride, filtered off, washed with 20% strength sodium chloride solution and made into a paste with 10 ml of a 5% strength buffer solution of pH 6. After drying the paste at 60°, a dyestuff is obtained, which dyes cotton, from a long liquor in accordance with the dyeing process of Example 1, in clear, yellowish-tinged green shades, or with which, in accordance with the process of Example 88, equivalent prints are obtained.

Similar dyestuffs are obtained when the azo components indicated in Table VI (column II) are subjected to a condensation reaction with cyanuric fluoride and the condensation product is then further reacted with the anthraquinone components of column III.

TABLE VI

| Example No. | II | III | Colour shade |
|---|---|---|---|
| 102 | 1-(2',5'-dichloro-4'-sulphophenyl-azo)-3-methyl-4-(5''-amino-2''-sulphophenylazo)-5-pyrazolone | 1-isopropylamino-4-(4'-amino-phenyl-amino)-5-hydroxy-anthraquinone-2',6-disulphonic acid | yellowish-tinged green |
| 103 | 3-(4'-amino-2'-acetylaminophenyl-azo)-naphthalene-1,5-disulphonic acid | 1-isopropylamino-4-(4'-amino-phenyl-amino)-5-hydroxy-anthraquinone-2',6-disulphonic acid | deep-yellowish-tinged green |
| 104 | 1-(4'-sulphophenyl)-3-carboxy-4-(5''-amino-2''-sulphophenylazo)-5-pyrazolone | 1-isopropylamino-4-(4'-amino-phenyl-amino)-anthraquinone-2',6-disulphonic acid | yellowish-tinged green |
| 105 | 1-(4'-sulphophenyl)-3-methyl-4-(5''-amino-2''-sulphophenylazo)-5-pyrazolone | 1-isopropylamino-4-(4'-methylamino-phenylamino)-anthraquinone-2',6-disulphonic acid | yellowish-tinged green |
| 106 | 2-(4'-amino-2'-methyl-phenylazo)-benzene-1,4-disulphonic acid | 1-isopropylamino-4-(4'-methylamino-phenylamino-anthraquinone-5-sulphonic acid | yellowish-tinged green |
| 107 | 2-(4'-amino-2'-ureido-phenylazo)-benzene-1,4-disulphonic acid | 1-isopropylamino-4-(4'-amino-phenyl-amino)-5-hydroxy-anthraquinone-2',6-disulphonic acid | yellowish-tinged green |
| 108 | 2-(4'-amino-2'-ureido-phenylazo)-benzene-1,4-disulphonic acid | 1-isopropylamino-4-(4'-methylamino-methyl-phenylamino)-5-hydroxy-anthraquinone-2',6-disulphonic acid | yellowish-tinged green |

TABLE VI-continued

| Example No. | II | III | Colour shade |
|---|---|---|---|
| 109 | 1-(2',5'-dichloro-4'-sulpho-phenylazo)-3-methyl-4-(5''-amino-2''-sulphophenylazo)-5-pyrazolone | 1-methylamino-4-(4'-aminophenyl-amino)-anthraquinone-2',6-disulphonic acid | yellowish-tinged green |
| 110 | 3-(4'-amino-2'-acetylamino-phenyl-azo)-naphthalene-1,5-disulphonic acid | 1-isopropylamino-4-(4'-methylamino-methyl-phenylamino)-5-hydroxy-anthra-quinone-2',6-disulphonic acid | yellowish-tinged green |
| 111 | 2-(4'-amino-2'-methylphenylazo)-benzene-1,4-disulphonic acid | 1-isopropylamino-4-(4'-amino-cyclo-hexylamino)-5-hydroxy-anthraquinone-6-sulphonic acid | yellowish-tinged green |
| 112 | 1-(4'-sulphophenyl)-3-carboxy-4-(4''-amino-2''-sulphophenylazo)-5-pyrazolone | 1-(2-butylamino)-4-(4'-amino-phenyl-amino)-5-hydroxy-anthraquinone-2',6-disulphonic acid | yellowish-tinged green |
| 113 | 1-(4'-sulphophenyl)-3-carboxy-4-(5''-amino-2''-sulpho-phenylazo)-5-pyrazolone | 1-(1-butylamino)-4-(4'-amino-phenyl-amino)-5-hydroxy-anthraquinone-2',6-disulphonic acid | yellowish-tinged green |

EXAMPLE 114

12.0 g of the trisodium salt of 2-(5'-amino-2'-sulpho-phenylazo)-1-hydroxy-7-(3''-sulphophenylamino)-naphthalene-3-sulphonic acid are dissolved, at pH 6, in 360 ml of water. After cooling the solution to 0°-5°, the pH value is adjusted to 5.0, and 1.8 ml of cyanuric fluoride are then added dropwise in the course of 10 minutes. The pH value is kept at 4.2-4.5 with 1 N sodium carbonate solution during the dropwise addition of the reactive component. The mixture is subsequently stirred at pH 4.5 for about 30 minutes. The resulting dark brown solution of 9.0 g of 1-amino-4-(3'-amino-2'-methyl-phenylamino)-anthraquinone-2,5'-disulphonic acid given and the pH value of the mixture is kept at 5.8-6.0 with 1 N sodium carbonate solution. After the condensation reaction between the difluorotriazinylazo dyestuff and the anthraquinone component has ended, the deep black solution is warmed to 20° and the resulting dyestuff is salted out with about 10% of sodium chloride, filtered off and washed with 10% strength sodium chloride solution. The dyestuff, which corresponds to the formula

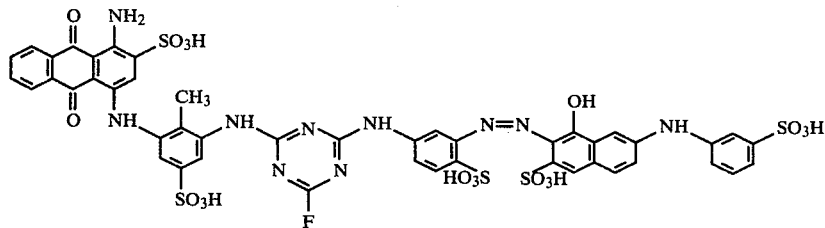

is dried at 40° in vacuo. Using this dyestuff, grey to black dyeings, depending on the amount of dyestuff employed, with good fastness to light and wet processing, including fastness to chlorine, are obtained on cotton, from a long liquor at 40°.

If the azo components indicated in Table VII, column II are subjected to a condensation reaction with cyanuric fluoride and the condensation products are further reacted with the anthraquinone components of column III, dyestuffs are obtained which dye cotton in the shades indicated.

TABLE VII

| Example No. | II | III | Colour shade |
|---|---|---|---|
| 115 | 2-(5'-amino-2'-sulpho-phenylazo)-1-hydroxy-7-(3''-sulphophenylamino)-naphthalene-3-sulphonic acid | 1-amino-4-(3'-amino-phenylamino)-anthraquinone-2,4'-disulphonic acid | grey-black |
| 116 | 2-(4'-amino-2'-sulpho-phenylazo)-1-hydroxy-7-(3''-sulphophenylamino)-naphthalene-3-sulphonic acid | 1-amino-4-(3'-amino-phenylamino)-anthraquinone-2,4'-disulphonic acid | corinth-black |
| 117 | 2-(4'-amino-2'-sulpho-phenylazo)-1-hydroxy-7-(3''-sulphophenylamino)-naphthalene-3-sulphonic acid | 1-amino-4-(3'-amino-2'-methyl-phenyl-amino)-anthraquinone-2,5'-disulphonic acid | grey |
| 118 | 2-(5'-amino-2'-sulpho-phenylazo)-1-hydroxy-naphthalene-3,6-disulphonic acid | 1-amino-4-(3'-amino-2'-methyl-phenyl-amino)-anthraquinone-2,5'-disulphonic acid | corinth |
| 119 | 2-(5'-amino-2'-sulpho-phenylazo)-1-hydroxy-naphthalene-3,6,8-trisulphonic acid | 1-amino-4-(3'-amino-2'-methyl-phenyl-amino)-anthraquinone-2,5'-disulphonic acid | corinth |
| 120 | 1-(5'-amino-2'-sulpho-phenylazo)-2-hydroxy-naphthalene-3,6-disulphonic acid | 1-amino-4-(3'-amino-2'-methyl-phenyl-amino)-anthraquinone-2,5'-disulphonic acid | corinth |
| 121 | 1-(2',5'-disulphophenylazo)-4-(4''-amino-5''-methoxy-2''-methyl-phenyl-azo)-naphthalene-6-sulphonic acid | 1-amino-4-(3'amino-2'-methyl-phenyl-amino)-anthraquinone-2,5'-disulphonic acid | brown |
| 122 | 1-(5'-amino-2'-sulphophenylazo)-2-amino-8-hydroxy-naphthalene-6- | 1-amino-4-(3'-amino-phenylamino)-anthraquinone-2,4'-disulphonic acid | corinth |

TABLE VII-continued

| Example No. | II | III | Colour shade |
|---|---|---|---|
| | sulphonic acid | | |
| 123 | 1(5'-amino-2'-sulphophenylazo)-2-phenylamino-8-hydroxynaphthalene-6-sulphonic acid | 1-amino-4-(3'amino-phenylamino)-anthraquinone-2,4'-disulphonic acid | corinth |
| 124 | 2-(5'-amino-2'-sulphophenylazo)-1-hydroxy-7-(3''-sulphophenyl)-naphthalene-3-sulphonic acid | 1-amino-4-(4'-amino-phenylamino)-anthraquinone-2,2'-disulphonic acid | greenish-tinged grey |
| 125 | 2-(4'-amino-2'-sulphophenylazo)-1-hydroxy-7-(3''-sulphophenyl)-naphthalene-3-sulphonic acid | 1-amino-4-(4'-amino-phenylamino)-anthraquinone-2,3''-disulphonic acid | reddish-tinged grey |

EXAMPLE 126

9.3 g of 3-(4'-amino-2'-methyl-phenylazo)-naphthalene-1,5-disulphonic acid are dissolved, at pH 7, in 300 ml of water. After cooling the solution to 0°–5°, 2.1 ml of cyanuric fluoride are added dropwise in the course of 10 minutes and the pH value of the solution is kept at 4.5–5.0 with 1 N sodium carbonate solution. The reaction has ended after a further 20 minutes. The resulting yellow solution of the difluorotriazinylazo dyestuff is now slowly added to a neutralised solution of 9.8 g of 1-amino-4-(4'-amino-phenylamino)-anthraquinone-2,2'-disulphonic acid in 200 ml of water at 0°–5° in the course of 15 minutes, and the pH value of the condensation mixture is kept at 6.3–6.5 with 1 N sodium carbonate solution. When the reaction has ended, after about 4 hours, the mixture is warmed to 20° and the dyestuff which has precipitated is filtered off, washed with 750 ml of 5% strength sodium chloride solution and dried at 40° in vacuo. It corresponds to the formula

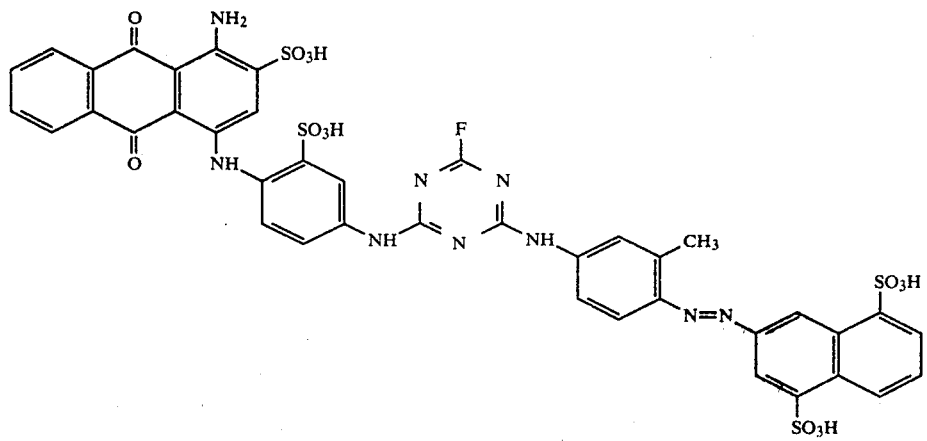

and dyes cotton, from a long liquor in accordance with the dyeing process of Example 1, in somewhat yellowish-tinged green shades. The dyeings exhibit good fastness to light and wet processing.

If the azo components of Table VIII, column II are reacted with cyanuric fluoride in an analogous manner and the reaction products are then subjected to a condensation reaction with the anthraquinone components of column III, similar dyestuffs are obtained which dye cotton green from a long liquor.

TABLE VIII

| Example No. | II | III | Colour shade |
|---|---|---|---|
| 127 | 3-(4'-amino-2'-acetylamino-phenylazo)-naphthalene-1,5-disulphonic acid | 1-amino-4-(4'-amino-phenylamino)-anthraquinone-2,2'-disulphonic acid | yellowish-tinged green |
| 128 | 3-(4'-amino-2'-acetylamino-phenylazo)-naphthalene-1,5-disulphonic acid | 1-amino-4-(4'-methylamino-phenylamino)-anthraquinone-2,2'-disulphonic acid | yellowish-tinged green |
| 129 | 3-(4'-amino-2'-acetylamino-phenylazo)-naphthalene-1,5-disulphonic acid | 1-amino-4-(5'-amino-4'-methyl-phenylamino)-anthraquinone-2,2'-disulphonic acid | yellowish-tinged green |
| 130 | 3-(4'-amino-2'-acetylamino-phenylazo)-naphthalene-1,5-disulphonic acid | 1-amino-4-(3'-amino-2'- methyl-phenylamino)-anthraquinone-2,5'-disulphonic acid | yellowish-tinged green |
| 131 | 3-(4'-amino-2'-acetylamino-phenylazo)-naphthalene-1,5-disulphonic acid | 1-amino-4-(4'-amino-phenylamino)-anthraquinone-2,2',6'-trisulphonic acid | yellowish-tinged green |
| 132 | 3-(4'-amino-2'-ureido-phenylazo)-naphthalene-1,5-disulphonic acid | 1-amino-4-(4'-methylamino-phenylamino)-anthraquinone-2,2'-disulphonic acid | olive-tinged green |
| 133 | 3-(4'-amino-2'-ureido-phenylazo)-naphthalene-1,5-disulphonic acid | 1-amino-4-(4'-amino-phenylamino)-anthraquinone-2,2'-disulphonic acid | olive-tinged green |
| 134 | 3-(4'-amino-2'-ureido-phenylazo)- | 1-amino-4-(3'-amino-2'-methyl- | olive- |

TABLE VIII-continued

| Example No. | II | III | Colour shade |
|---|---|---|---|
| | naphthalene-1,5-disulphonic acid | phenylamino)-anthraquinone-2,5'-disulphonic acid | tinged green |
| 135 | 3-(4'-amino-2'-methyl-phenylazo)-naphthalene-1,5-disulphonic acid | 1-amino-4-(3'-amino-2'-methyl-phenylamino)-anthraquinone-2,5'-disulphonic acid | green |
| 136 | 3-(4'-amino-2'-methyl-phenylazo)-naphthalene-1,5-disulphonic acid | 1-amino-4-(4'-methylamino-phenylamino)-anthraquinone-2,2'-disulphonic acid | green |
| 137 | 7-(4'-amino-2'-methyl-phenylazo)-naphthalene-1,3,6-trisulphonic acid | 1-amino-4-(3'-amino-2'-methyl-phenylamino)-anthraquinone-2,5'-disulphonic acid | green |
| 138 | 7-(4'-amino-2'-methyl-phenylazo)-naphthalene-1,3-disulphonic acid | 1-amino-4-(3'-amino-2'-methyl)-phenylamino)-anthraquinone-2,5'-disulphonic acid | green |
| 139 | 7-(4'-amino-2'-methyl-phenylazo)-naphthalene-1,3-disulphonic acid | 1-amino-4-(4'-amino-phenylamino)-anthraquinone-2,2'-disulphonic acid | green |
| 140 | 7-(4'-amino-2'-methyl-phenylazo)-naphthalene-1,3-disulphonic acid | 1-amino-4-(4'-methylamino-phenylamino)-anthraquinone-2,2'-disulphonic acid | green |
| 141 | 7-(4'-amino-2'-methyl-phenylazo)-naphthalene-1,3,6-trisulphonic acid | 1-amino-4-(4'-methylamino-phenylamino)-anthraquinone-2,2'-disulphonic acid | green |
| 142 | 7-(4'-amino-2'-methyl-phenylazo)-naphthalene-1,3,6-trisulphonic acid | 1-amino-4-(3'-amino-2'-methyl-phenylamino)-anthraquinone-2-sulphonic acid | green |
| 143 | 7-(4'-amino-2'-methyl-phenylazo)-naphthalene-1,3,6-trisulphonic acid | 1-amino-4-(4'-amino-phenylamino)-anthraquinone-2,2'-disulphonic acid | green |
| 144 | 7-(4'-amino-2'-methyl-phenylazo)-naphthalene-1,3,6-trisulphonic acid | 1-amino-4-(3'-amino-phenylamino)-anthraquinone-2-sulphonic acid | green |
| 145 | 7-(4'-amino-2'-acetylamino-phenylazo)-naphthalene-1,3-disulphonic acid | 1-amino-4-(4'-amino-phenylamino)-anthraquinone-2,2'-disulphonic acid | yellowish-tinged green |
| 146 | 7-(4'-amino-2'-acetylamino-phenylazo)-naphtahlene-1,3-disulphonic acid | 1-amino-4-(3'-amino-2'-methyl-phenylamino)-anthraquinone-2,5'-disulphonic acid | yellowish-tinged green |
| 147 | 7-(4'-amino-2'-ureido-phenylazo)-naphthalene-1,3-disulphonic acid | 1-amino-4-(3'-amino-2'-methyl-phenylamino)-anthraquinone-2,5'-disulphonic acid | olive-tinged green |
| 148 | 7-(4'-amino-2'-ureido-phenylazo)-naphthalene-1,3-disulphonic acid | 1-amino-4-(4'-amino-phenylamino)-anthraquinone-2,2'-disulphonic acid | olive-tinged green |
| 149 | 7-4'-amino-2'-acetylamino-phenylazo)-naphthalene-1,3,6-trisulphonic acid | 1-amino-4-(3'-amino-2'-methyl-phenylamino)-anthraquinone-2,5'-disulphonic acid | yellowish-tinged green |
| 150 | 7-(4'-amino-2'-acetylamino-phenylazo)-naphthalene-1,3,6-trisulphonic acid | 1-amino-4-(4'-amino-phenylamino)-anthraquinone-2,2'-disulphonic acid | yellowish-tinged green |
| 151 | 7-(4'-amino-2'-acetylamino-phenylazo)-naphthalene-1,3,6-trisulphonic acid | 1-amino-4-(4'-methylamino-phenylamino)-anthraquinone-2,2'-disulphonic acid | yellowish-tinged green |
| 152 | 7-(4'-amino-2'-acetylamino-phenylazo)-naphthalene-1,3,6-trisulphonic acid | 1-amino-4-(3'-amino-2'-methyl-phenylamino)-anthraquinone-2-sulphonic acid | yellowish-tinged green |
| 153 | 7-(4'-amino-2'-acetylamino-phenylazo)-naphthalene-1,3,6-trisulphonic acid | 1-amino-4-(3'-amino-phenylamino)-anthraquinone-2-sulphonic acid | yellowish-tinged green |
| 154 | 7-(4'-amino-2'-acetylamino-phenylazo)-naphthalene-1,3,6-trisulfonic acid | 1-amino-4-(4'-amino-2'-carboxy-phenylamino)-anthraquinone-2-sulphonic acid | yellowish-tinged green |
| 155 | 7-(4'-amino-2'-ureido-phenylazo)-naphthalene-1,3,6-trisulphonic acid | 1-amino-4-(4'-amino-phenylamino)-anthraquinone-2,2'-disulphonic acid | yellowish-tinged green |
| 156 | 7-(4'-amino-2'-ureido-phenylazo)-naphthalene-1,3,6-trisulphonic acid | 1-amino-4-(3'-amino-2'-methyl-phenylamino)-2,5'-disulphonic acid | olive-tinged green |
| 157 | 7-(4'-amino-2'-ureido-phenylazo)-naphthalene-1,3,6-trisulphonic acid | 1-amino-4-(4'-methylamino-phenylamino)-anthraquinone-2,2'-disulphonic acid | olive-tinged green |
| 158 | 7-(4'-amino-2'-ureido-phenylazo)-naphthalene-1,3,6-trisulphonic acid | 1-amino-4-(5'-amino-4'-methyl-phenylamino)-anthraquinone-2,2'-disulphonic acid | olive-tinged green |

EXAMPLE 159

9.8 g of 1-amino-4-(3'-amino-phenylamino)-anthraquinone-2,4'-disulphonic acid are dissolved in 150 ml of water. The solution is adjusted to pH 5 and cooled to 0°–5°, and 1.9 ml of cyanuric fluoride are then slowly added dropwise. During this addition, the pH value is kept at 4.5 with sodium carbonate solution and the mixture is subsequently stirred under these conditions for a further 15 minutes. 4.8 g of 6-amino-1-naphthol-3-sulphonic acid are dissolved, at pH 6, in 50 ml of water. The solution is added dropwise to the anthraquinone component, the pH value of the mixture is kept at 6.0 with sodium carbonate solution and the temperature is allowed to rise gradually to 20°.

When the condensation reaction has ended, the reaction mixture is cooled to 0°–5° and a diazonium salt solution which has been obtained by diazotising 3.5 g of 2-amino-benzene-sulphonic acid is then added. The pH value is kept at 6.5–7 for the coupling reaction and, after the diazonium salt has been added, the temperature is allowed to rise gradually to 20°. After the coupling reaction has ended, the dyestuff is salted out with 50 g of sodium chloride, filtered off and washed with 10% strength sodium chloride solution, and the product is made into a paste with 10 ml of a 5% strength buffer solution which has a pH value of 6. After drying the paste at 60°, a product is obtained which corresponds to the formula ate solution and the temperature is further kept at 0°–5°, for the purpose of the condensation reaction.

When the condensation reaction has ended, a diazonium salt solution which has been prepared by diazotising 7.6 g of 2-aminobenzo-1,4-disulphonic acid in 100 ml of water and 20 ml of concentrated hydrochloric acid with 2.1 g of sodium nitrite at 0°–5° is added to the greenish-tinged blue dyestuff solution.

The pH value of the mixture is kept at 5–6, and the mixture is subsequently stirred until the coupling reaction has ended. The dyestuff is salted out of the brown

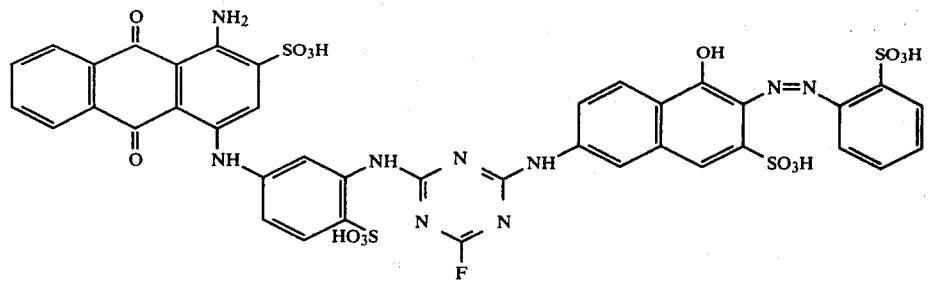

and dyes cotton, in accordance with the dyeing process of Example 1, in brownish-tinged olive shades.

EXAMPLE 160

14.7 g of 1-amino-4-(4'-amino-phenylamino)-anthraquinone-2,3'-disulphonic acid are dissolved, by neutralisation, in 300 ml of water. After cooling the solution to 0°–5° and adjusting the pH value to 4.5, 2.7 ml of cyanuric fluoride are added dropwise in the course of 10 minutes, and the pH value of the solution is kept at 4.2–4.5 by means of 2 N sodium carbonate solution. The reaction has ended a few minutes after the dropwise addition. A solution, adjusted to pH 6, of 7.2 g of 6-amino-1-naphthol-3-sulphonic acid in 100 ml of water is then added to the anthraquinone component and the pH value is kept at 5.8–6.2 with sodium carbonsolution at 20° with 20% of sodium chloride. The precipitate is filtered off and washed with 20% strength sodium chloride solution, and the product of the formula

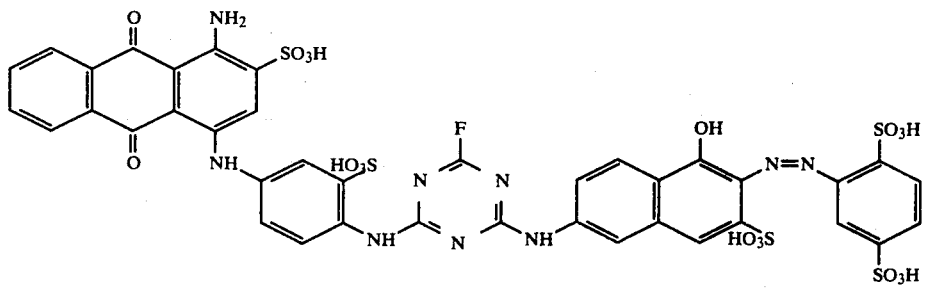

is dried at 40° in vacuo. The dyestuff dyes cotton, from a long liquor in accordance with the dyeing process of Example 1, in brownish-tinged olive shades. The dyeings have very good fastness to light and wet processing.

Further dyestuffs can be obtained analogously when the anthraquinone components listed in Table IX, column II are subjected to a condensation reaction with cyanuric fluoride, the products are then subjected to a condensation reaction with the coupling components of column III, and finally the diazonium salts of the amines from column IV are coupled to the condensation products.

TABLE IX

| Example No. | Anthraquinone component | Coupling component | Diazo component | Colour shade |
|---|---|---|---|---|
| 161 | 1-amino-4-(3'-amino-phenyl-amino)-anthraquinone-2,4'-disulphonic acid | 6-amino-1-naphthol-3-sulphonic acid | 2-amino-5-methoxy-benzenesulphonic acid | corinth |
| 162 | 1-amino-4(4'-amino-phenyl-amino)-anthraquinone-2,3'-disulphonic acid | 6-amino-1-naphthol-3-sulphonic acid | 2-amino-5-methoxy-benzenesulphonic acid | corinth |
| 163 | 1-amino-4-(3'-amino-phenyl-amino)-anthraquinone-2,4'-disulphonic acid | 6-amino-1-naphthol-3-sulphonic acid | 4-aminobenzene-1,3-disulphonic acid | brownish-tinged olive |
| 164 | 1-amino-4-(4'-amino-phenyl-amino)-anthraquinone-2,3'-disulphonic acid | 6-amino-1-naphthol-3-sulphonic acid | 7-aminonaphthalene-1,3,6-trisulphonic acid | brown |

TABLE IX-continued

| Example No. | Anthraquinone component | Coupling component | Diazo component | Colour shade |
|---|---|---|---|---|
| 165 | 1-amino-4-(3'-amino-phenyl-amino)-anthraquinone-2,4'-disulphonic acid | 6-amino-1-naphthol-3-sulphonic acid | 3-aminonaphthalene-1,5-disulphonic acid | reddish-tinged brown |
| 166 | 1-amino-4-(4'-amino-phenyl-amino)-anthraquinone-2,3'-disulphonic acid | 7-amino-1-napthol-3-sulphonic acid | 2-aminobenzene-1,4-disulphonic acid | grey |
| 167 | 1-amino-4-(3'-amino-phenyl-amino)-anthraquinone-2,4'-disulphonic acid | 7-amino-1-naphthol-3-sulphonic acid | 4-aminobenzene-1,3-disulphonic acid | grey |
| 168 | 1-amino-4-(3'-phenyl-amino)-anthraquinone-2,3'-disulphonic acid | 7-amino-1-naphthol-3-sulphonic acid | 2-aminobenzene-sulphonic acid | corinth |

EXAMPLE 169

9.8 g of 1-amino-4-(4'-amino-phenylamino)-anthraquinone-2,3'-disulphonic acid in 200 ml of water are subjected to a condensation reaction with 2.0 ml of cyanuric fluoride at pH 4.2–4.7 and at 0°–5° in the manner described in Example 2. A solution, adjusted to pH 7, of 12.7 g of 4-(4'-amino-5'-methoxy-2'-methyl-phenylazo)-1-(2'',5''-disulphophenylazo)-naphthalene-6-sulphonic acid in 250 ml of water is added to dissolve the difluorotriazinylanthraquinone dyestuff and the pH value of the reaction mixture is kept at 6.0, the temperature being 0°–5°. After subsequently stirring the mixture under these conditions for about three hours, the condensation reaction has ended. The dyestuff is salted out of the brown solution with 20% of sodium chloride and the precipitate is filtered off and washed with 20% strength sodium chloride solution. After drying, a product is obtained which dyes cotton, in accordance with the dyeing process of Example 1, in brown shades with good fastness properties and which corresponds to the formula

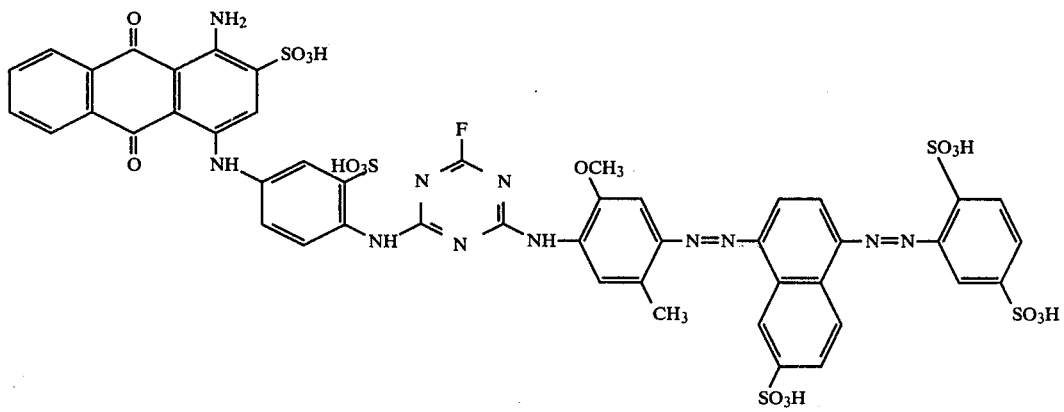

EXAMPLE 170

9.8 g of 1-amino-4-(3'-amino-phenylamino)-anthraquinone-2,4'-disulphonic acid in 200 ml of water are subjected to a condensation reaction with 1.9 ml of cyanuric fluoride at 0°–5° and at pH 4.2–4.7. After the reaction has ended, a neutralised solution of 12.3 g of 1-(4'-amino-2'-methyl-phenylazo)-4-(2'',5''-disulpho-phenylazo)naphthalene-6-sulphonic acid in 150 ml of water is added dropwise. During this addition, the reaction mixture is kept at 6.0 with 20% strength sodium carbonate solution. The temperature is allowed to rise gradually to 20° under these pH conditions. When the condensation reaction has ended, the dyestuff of the formula

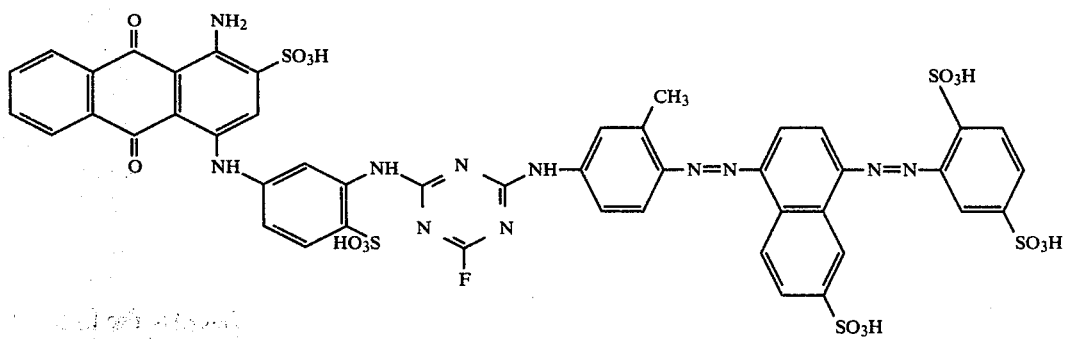

is salted out with 125 g of sodium chloride, the precipitate is filtered off and the filter cake is washed with 25% strength sodium chloride solution and, after adding 5 ml of a 10% strength buffer solution which has a pH value of 6, is dried at 60°.

The dyestuff dyes cotton, from a long liquor in accordance with the process of Example 1, or prints cotton in accordance with the statements of Example 88, in neutral brown shades.

Further dyestuffs are obtained by subjecting the anthraquinone components indicated in Table X to a condensation reaction with cyanuric fluoride and the disazo components listed in Table X.

TABLE X

| Example No. | Anthraquinone component | Disazo component | Colour shade |
| --- | --- | --- | --- |
| 171 | 1-amino-4-(3'-amino-phenylamino)-anthraquinone-2,4'-disulphonic acid | 1-(4'-amino-5'-methoxy-2'-methyl-phenylazo)-4-(2'',4''-disulpho-phenylazo)-naphthalene-6-sulphonic acid | brown |
| 172 | 1-amino-4-(3'-amino-phenylamino)-anthraquinone-2,4'-disulphonic acid | 2-(5'-amino-2'-sulpho-phenylazo)-7-(2''-sulphophenylazo)-8-amino-1-naphthol-3,6-disulphonic acid | dark blue |
| 173 | 1-amino-4-(3'-amino-2'-methyl-phenylamino)-anthraquinone-2,5'-disulphonic acid | 1-(4'-amino-2'-sulphophenylazo)-4-[5''-sulpho-4-41 -(4''- '-methyl-phenyl-amino)-1''-naphthylazo]-naphthalene-6-sulphonic acid | dark blue |
| 174 | 1-amino-4-(4'-amino-phenylamino)-anthraquinone-2,3'-disulphonic acid | 1-(4'-amino-2'-sulphophenylazo)-4-[5''-sulpho-4''-(4''' amino)-1''-naphthylazo]naphthalene-6-sulphonic acid | dark blue |

EXAMPLE 175

9.8 g of 1-amino-4-(3'-amino-phenylamino)-anthraquinone-2,4'-disulphonic acid in 200 ml of water are subjected to a condensation reaction with 1.9 ml of cyanuric fluoride, which is slowly added dropwise, at 0°–5° and at pH 4.2–4.7. After the first condensation stage has been finished, a neutralised solution of 9.5 g of 2-(2',5'-disulphophenylazo)-acetoacetic acid 4''-amino-anilide in 150 ml of water is added dropwise and the pH value of the reaction mixture is kept at 6.0. The temperature is allowed to rise gradually to 20°, the pH value being further kept at 6. When the reaction has ended, after subsequently stirring for several hours, the dyestuff of the formula

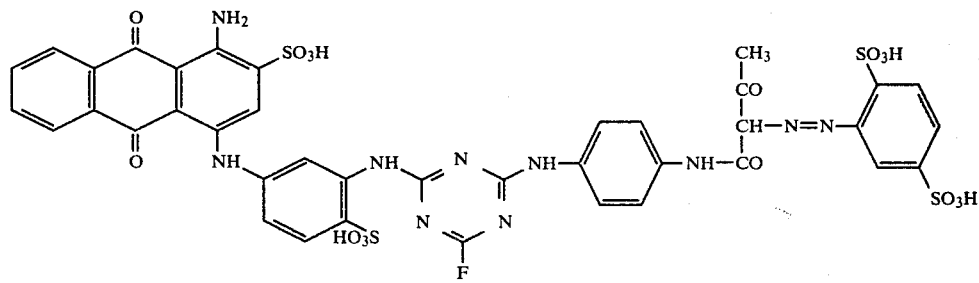

is salted out with 120 g of sodium chloride and filtered off and the filter cake is washed with 25% strength sodium chloride solution and dried at 40° in vacuo.

In accordance with the printing process of Example 88, the dyestuff gives blue-green prints with good fastness properties.

EXAMPLE 176

9.8 g of 1-amino-4-(3'-amino-phenylamino)-anthraquinone-2,4'-disulphonic acid are dissolved in 150 ml of water and are reacted at 0°–5° by adding 1.9 ml of cyanuric fluoride dropwise, the pH value being kept at 4.5 with 20% strength sodium carbonate solution. After subsequently stirring the mixture for a short time, a neutralised solution of 31.4 g of an azo dyestuff having the following structure

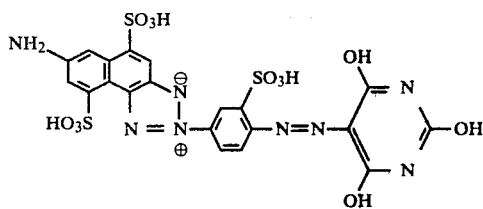

in 200 ml of water is added dropwise. The pH value of the reaction mixture is kept at 6.0–6.5 with sodium carbonate solution during the dropwise addition, and the temperature is then allowed to rise to 20°, the pH value being further kept within the limits indicated. When the reaction has finished, the dyestuff is salted out with 50 g of sodium chloride. The product, which corresponds to the formula

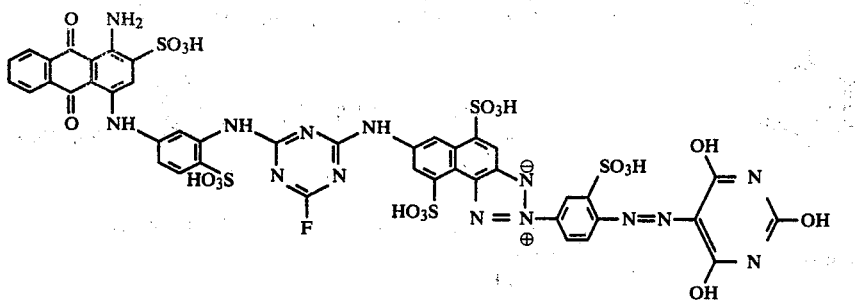

is filtered off, washed with 15% strength sodium chloride solution and, after adding 5 ml of 10% strength buffer solution of pH 6.0, is dried at 60°. The resulting dyestuff dyes cotton, from a long liquor in accordance with the dyeing process of Example 1, in deep yellowish-tinged green shades.

Further dyestuffs are obtained when the anthraquinone components and azo components listed in Table XI are linked to one another via cyanuric fluoride in an analogous manner.

is salted out with 60 g of sodium chloride, the precipitate is filtered off, the filter cake is washed with 15% strength sodium chloride solution and the product is dried at 40° in vacuo. The dyestuff dyes cotton, from a long liquor, in strong, violet shades and, when used for printing in accordance with the process of Example 88, gives prints which are also violet.

We claim:

1. Dyestuffs of the formula

TABLE XI

| Example No. | Anthraquinone component | Azo component | Color shade |
|---|---|---|---|
| 177 | 1-amino-4-(3'-amino-phenylamino)-anthraquinone-2,4'-disulphonic acid | 5-(5'-amino-2'-sulpho-phenylazo)-1,4-dimethyl-6-hydroxy-3-sulpho-methyl-2-pyridone | yellowish-tinged green |
| 178 | 1-amino-4-(3'-amino-phenylamino)-anthraquinone-2,4'-disulphonic acid | 5-(5'-2'-sulphophenylazo)-2,4,6-trihydroxy-pyrimidine | yellowish-tinged green |
| 179 | 1-amino-4-(4'-amino-phenylamino)-anthraquinone-2,3'-disulphonic acid | 3-(4'-amino-2'-sulpho-phenylazo)-2,4-diamino-5-cyano-6-(3''-sulpho-phenyl)-pyridine | green |
| 180 | 1-amino-4-(4'-amino-phenylamino)-anthraquinone-2,3'-disulphonic acid | 2-(5'-amino-2'-sulpho-phenylazo)-acetoacetic acid 4''-amino-3'',5''-disulphoanilide | yellowish-tinged green |

EXAMPLE 181

9.8 g of 1-amino-4-(3'-amino-phenylamino)-anthraquinone-2,4'-disulphonic acid are dissolved in 200 ml of water and subjected to a condensation reaction with 1.9 ml of cyanuric fluoride, which is added dropwise, at 0°–5° and at pH 4.5. After subsequently stirring the mixture for a short time, a neutral solution of 9.8 g of the copper complex of 6-amino-2-(2'-hydroxy-5'-sulpho-phenylazo)-1-naphthol-3-sulphonic acid in 150 ml of water is then added and the reaction mixture is adjusted to 6.0 with 20% strength sodium carbonate solution. The temperature is allowed to rise to 20°, the pH value being further kept at pH 6. When the reaction has ended, after several hours, the dyestuff of the formula

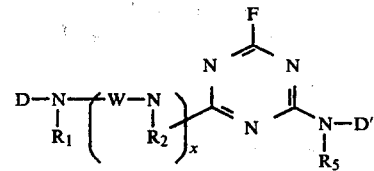

wherein

D = optionally substituted anthraquinonyl,
W = a bridge member,
$R_1$–$R_3$ = H or optionally substituted $C_1$–$C_4$-alkyl,
x = 0 or 1 and
D' = the radical of an azo dyestuff.

2. Dyestuffs according to claim 1, in which

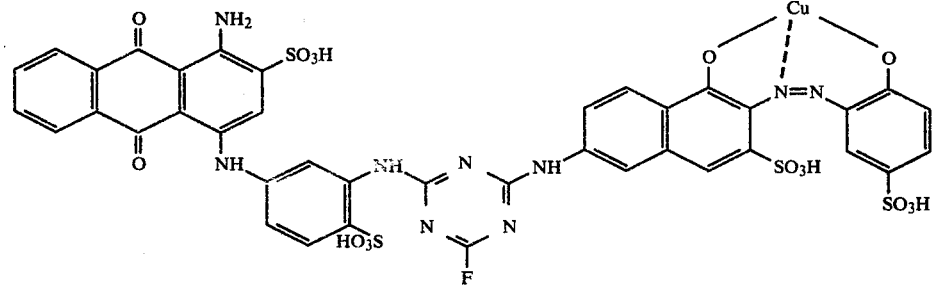

D = 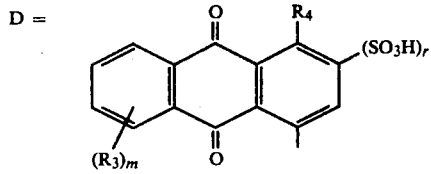

wherein
$R_4$ = optionally substituted amino,
$R_5$ = a substituent,
m = 0, 1 or 2 and
r = 0 or 1.

3. Dyestuffs of claims 1 or 2, in which

D = 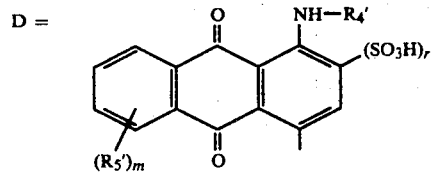

wherein
$R'_4$ = H or $C_1$-$C_4$-alkyl, in particular branched $C_3$-$C_4$-alkyl,
$R'_5$ = halogen, in particular Cl or Br, OH, sulpho, $C_1$-$C_4$-alkoxy or acylamino,
m = 0, 'or 2 and
r = 0 or 1, and preferably 0 if $R'_4$=$C_1$-$C_4$-alkyl.

4. Dyestuffs of claim 1, wherein

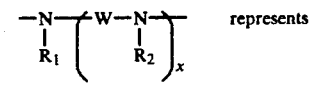 represents

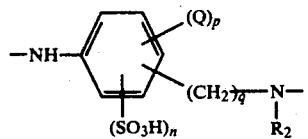

in which
Q = $C_1$-$C_4$-alkyl, $C_1$-$C_4$-alkoxy, carboxyl or halogen, in particular Cl and Br,
n = 0, 1 or 2,
p = 0, 1, 2 or 3 and q = 0, 1 or 2.

5. Dyestuffs of claim 1, wherein

—N—(W—N)— represents —NH—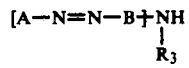

wherein Q, $R_2$, p and q have the meaning indicated above.

6. Dyestuffs of claim 1, wherein

D'—N—
     |
     $R_3$ represents the radical of a monoazo or polyazo dyestuff which has a —NH($R_3$)— group and contains sulpho groups and optionally contains a metal.

7. Dyestuffs of claim 1, wherein D'—N($R_3$)— represents the radical of an azo dyestuff of the formula wherein

[A—N=N—B]NH
          |
          $R_3$

A = the radical of a heterocyclic or carbocyclic diazo component, preferably of the benzene, naphthalene or triazole series,
B represents the radical of a heterocyclic, carbocyclic or CH-acid coupling component, in particular the radical of a phenol, naphthol, aniline, naphthylamine, 5-aminopyrazole, 5-pyrazolone, pyridone, aminopyridine, acetoacetic acid arylide, indole or pyrimidine which is optionally further substituted,

—N—
 |
 $R_3$ is bonded either to the diazo component A or to the coupling component B, and in particular, preferably, to a C atom of an aromatic-carbocyclic or aromatic-heterocyclic ring and $R_3$ has the meaning indicated in claim 1.

* * * * *

UNITED STATES PATENT AND TRADEMARK OFFICE
CERTIFICATE OF CORRECTION

PATENT NO. : 4,242,259
DATED : December 30, 1980
INVENTOR(S) : Wolfgang Harms, et al It is certified that error appears in the above—identified patent and that said Letters Patent is hereby corrected as shown below:

Column 7, line 68, "2,2', 6" not "2,3',6".

Column 35, Comp. 163: Anthraquinone col., 1st line - "(4'-amino)" not "3'";

2nd line - "2,3'" not "2,4'".

Column 37, Comp. 165: anthraquinone col., 1st line - "(4'-amino)" not "3'";

2nd line - "2,3'" not "2,4'".

Column 37, Comp. 167: anthraquinone col. 1st line - "4'-amino)" not "3'";

2nd line - "2,3'" not "2,4'".

Column 37, Comp 168: line 1 "(4'-amino-phenyl-" not "(3'-phenyl-".

UNITED STATES PATENT AND TRADEMARK OFFICE
CERTIFICATE OF CORRECTION

PATENT NO. : 4,242,259                     Page 2 of 2

DATED : December 30, 1980

INVENTOR(S) : Wolfgang Harms, et al

It is certified that error appears in the above—identified patent and that said Letters Patent is hereby corrected as shown below:

Column 41, move "tinged green" to color shade column of

Table XI:
Comp. 178, Azo col., line 1: insert "amino-" between "5'-" and "2'".

Column 42, line 46, bottom right of formula "R$_3$" not "R$_5$".

Column 44, line 23, "wherein" should be below formula.

Signed and Sealed this

Second Day of June 1981

[SEAL]

Attest:

RENE D. TEGTMEYER

Attesting Officer      Acting Commissioner of Patents and Trademarks